US008830864B2

(12) United States Patent
Anthony, Jr. et al.

(10) Patent No.: US 8,830,864 B2
(45) Date of Patent: *Sep. 9, 2014

(54) MAINTENANCE OF HIGH-SPEED CHANNELS BY INSERTING CHANNEL MAINTENANCE DATA IN A MOBILE DATA NETWORK TO AVOID CHANNEL TYPE SWITCHING

(71) Applicant: International Business Machines Corporation, Armonk, NY (US)

(72) Inventors: Bruce O. Anthony, Jr., Pine Island, MN (US); Ronald L. Billau, Rochester, MN (US); Canio Cillis, Berlin (DE); Robert B. Nicholson, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,249

(22) Filed: Dec. 5, 2012

(65) Prior Publication Data

US 2013/0094394 A1     Apr. 18, 2013

Related U.S. Application Data

(63) Continuation of application No. 13/233,858, filed on Sep. 15, 2011, now Pat. No. 8,625,452.

(51) Int. Cl.
*H04W 24/10* (2009.01)
*H04B 7/00* (2006.01)

(52) U.S. Cl.
USPC ........... 370/252; 455/507; 455/509; 455/450; 455/464; 370/329; 370/431

(58) Field of Classification Search
USPC ......... 370/234, 250–256, 329, 341–350, 431; 455/507, 509, 450, 464
See application file for complete search history.

(56) References Cited

U.S. PATENT DOCUMENTS 6,347,091 B1    2/2002  Wallentin et al.
6,519,461 B1 *  2/2003  Andersson et al. ........... 455/453

(Continued)

FOREIGN PATENT DOCUMENTS

WO    WO2011182351 A1    2/2011

OTHER PUBLICATIONS

Kundalkar et al., "LIPA: Local IP Access via Home Node B", Nov. 13, 2009.

(Continued)

*Primary Examiner* — Asad Nawaz
*Assistant Examiner* — Berhanu Belete
(74) *Attorney, Agent, or Firm* — Martin & Associates, LLC; Derek P. Martin

(57) ABSTRACT

A mobile data network includes a radio access network and a core network. A first service mechanism in the radio access network breaks out data coming from a basestation. When data is broken out by the first service mechanism, the data is delivered at the edge, which means the true activity of the channel is not visible to the core network. The reduction of data in the core network due to serving data at the edge risks causing a switch from a high-speed channel to a low-speed channel by the mechanism in the core network that monitors and assigns channel speeds. In order to maintain the high-speed channel, the on-going data rate for a subscriber session is monitored and channel maintenance traffic is injected towards and from the radio network controller (in both directions). The amount of channel maintenance traffic depends on thresholds that determine a desired data rate.

11 Claims, 23 Drawing Sheets

(56) References Cited

U.S. PATENT DOCUMENTS

| | | | |
|---|---|---|---|
| 7,389,529 B1* | 6/2008 | Enderwick et al. | 726/1 |
| 7,596,090 B2* | 9/2009 | Black | 370/234 |
| 7,724,707 B2 | 5/2010 | Foster et al. | |
| 7,916,649 B2 | 3/2011 | Buvaneswari et al. | |
| 8,170,017 B2* | 5/2012 | Fletcher et al. | 370/389 |
| 8,432,871 B1 | 4/2013 | Sarnaik et al. | |
| 2003/0067897 A1* | 4/2003 | Black | 370/335 |
| 2004/0146027 A1* | 7/2004 | Shinozaki et al. | 370/335 |
| 2004/0264393 A1 | 12/2004 | Desgagne et al. | |
| 2005/0125496 A1* | 6/2005 | Thuerk | 709/204 |
| 2005/0266799 A1* | 12/2005 | Hara et al. | 455/63.4 |
| 2006/0155771 A1 | 7/2006 | Nordmark et al. | |
| 2007/0060167 A1 | 3/2007 | Damnjanovic et al. | |
| 2007/0086485 A1 | 4/2007 | Vega-Garcia et al. | |
| 2007/0127443 A1* | 6/2007 | Spencer et al. | 370/352 |
| 2008/0159148 A1 | 7/2008 | Morinaga et al. | |
| 2008/0228942 A1 | 9/2008 | Lor et al. | |
| 2008/0267128 A1 | 10/2008 | Bennett et al. | |
| 2009/0046661 A1 | 2/2009 | Casati et al. | |
| 2009/0219864 A1 | 9/2009 | Parolari | |
| 2009/0232015 A1 | 9/2009 | Domschitz et al. | |
| 2010/0103923 A1 | 4/2010 | Nosley et al. | |
| 2010/0130170 A1 | 5/2010 | Liu et al. | |
| 2010/0246585 A1 | 9/2010 | Mantri et al. | |
| 2010/0303042 A1 | 12/2010 | Bergman et al. | |
| 2011/0070906 A1* | 3/2011 | Chami et al. | 455/507 |
| 2011/0075675 A1 | 3/2011 | Koodli et al. | |
| 2011/0076985 A1 | 3/2011 | Chami et al. | |
| 2011/0103310 A1 | 5/2011 | Stojanovski et al. | |
| 2011/0134982 A1 | 6/2011 | Reinhardt | |
| 2011/0235595 A1 | 9/2011 | Mehta et al. | |
| 2012/0184258 A1 | 7/2012 | Kovvali et al. | |
| 2012/0188895 A1 | 7/2012 | Punz et al. | |
| 2012/0224578 A1 | 9/2012 | Mih Ly et al. | |
| 2012/0243432 A1 | 9/2012 | Liebsch et al. | |
| 2013/0029708 A1 | 1/2013 | Fox et al. | |

OTHER PUBLICATIONS

Theimer et al., "Generic Policy Control for Local Breakout", Prior Art Publishing—Technisches Journal, Nov. 2009, p. 1.

Belhouchet et al., "ITU/BDT Arab Regional Workshop on 4G Wireless Systems LTE Technology", Jan. 2010.

* cited by examiner

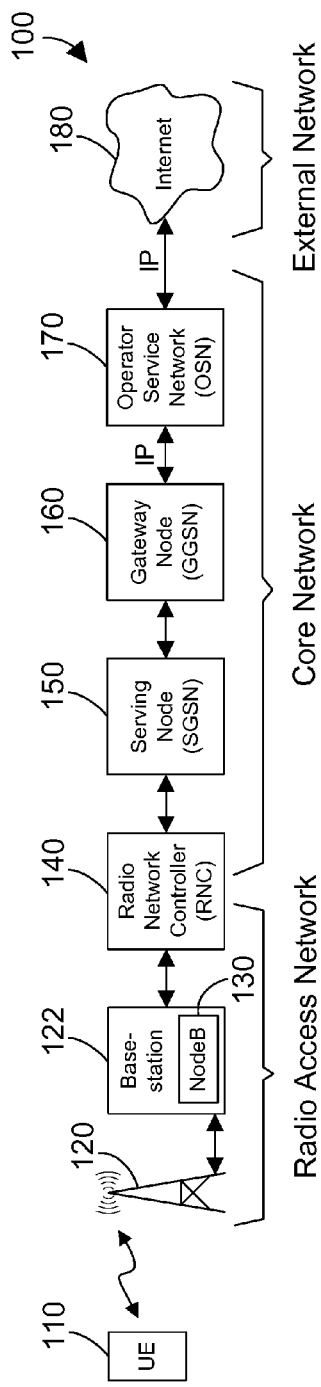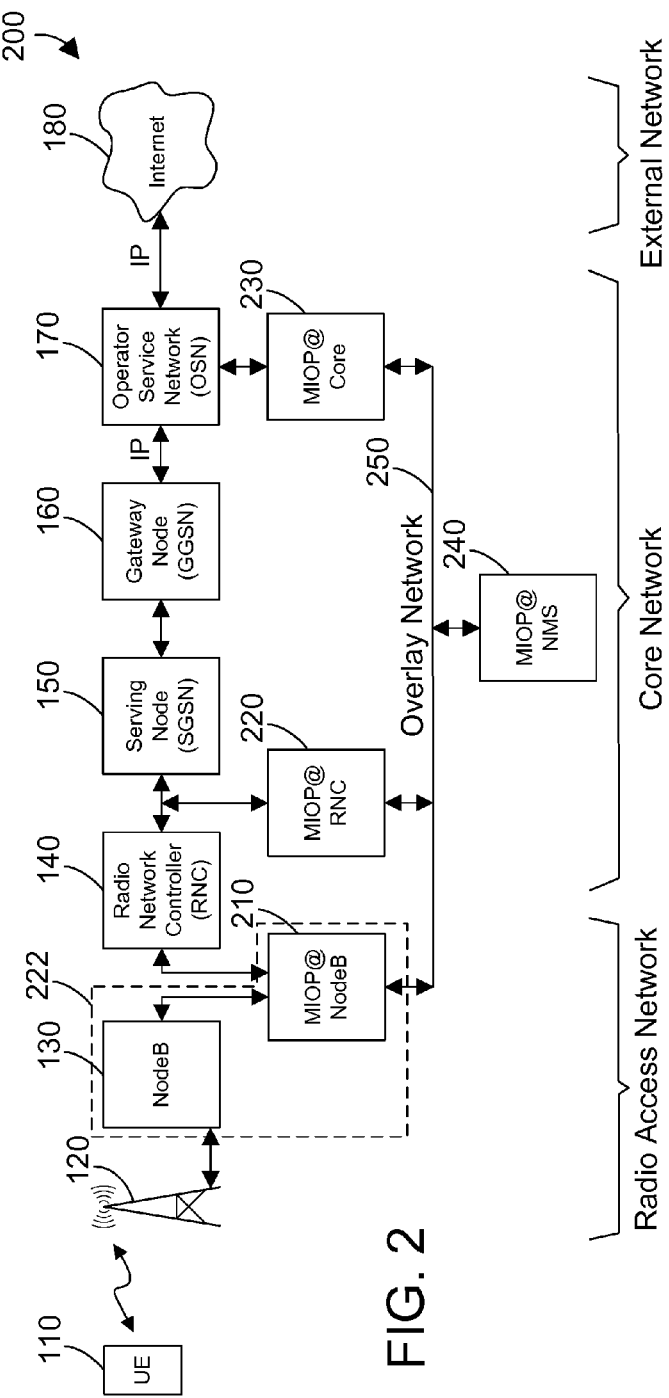

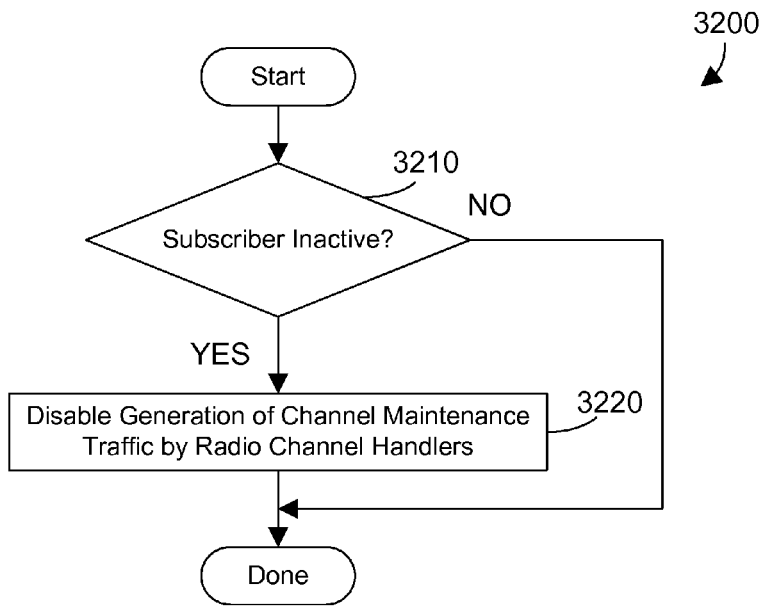

FIG. 32

| Data Plane | Ethernet Header |  |  |  |
|---|---|---|---|---|
| Network Layer | IP Header (RNC IP, UPM 3GPP Transport IP) |  |  |  |
| Transport | UDP Header (Src Port 2152, Dst Port 2152) |  |  |  |
|  | GTP Header=(TEID for which dummy packet to get generated) |  |  |  |
| Dummy IP Header | Version 4 | IP HL 5 | TOS 0 | <data gram length> |
|  | Identification <seq id> | Flags(R,DF 1,MF 0) |  | 0 |
|  | TTL 1 | Prot.=254 | Header Checksum <cksum> |  |
|  | Source Address <UE IP Address> |  |  |  |
|  | Destination Address <Dummy IP Address> (PrivateIP) |  |  |  |
| Dummy Payload | Rate = <Ty> (Downlink Rate bytes/sec) |  |  |  |
|  |  |  |  |  |

FIG. 33

MAINTENANCE OF HIGH-SPEED CHANNELS BY INSERTING CHANNEL MAINTENANCE DATA IN A MOBILE DATA NETWORK TO AVOID CHANNEL TYPE SWITCHING

BACKGROUND

1. Technical Field

This disclosure generally relates to mobile data systems, and more specifically relates to channel type switching in a mobile data network.

2. Background Art

Mobile phones have evolved into "smart phones" that allow a user not only to make a call, but also to access data, such as e-mails, the internet, etc. Mobile phone networks have evolved as well to provide the data services that new mobile devices require. For example, 3G networks cover most of the United States, and allow users high-speed wireless data access on their mobile devices. In addition, phones are not the only devices that can access mobile data networks. Many mobile phone companies provide equipment and services that allow a subscriber to plug a mobile access card into a Universal Serial Bus (USB) port on a laptop computer, and provide wireless internet to the laptop computer through the mobile data network. In addition, some newer mobile phones allow the mobile phone to function as a wireless hotspot, which supports connecting several laptop computers or other wireless devices to the mobile phone, which in turn provides data services via the mobile data network. As time marches on, the amount of data served on mobile data networks will continue to rise exponentially.

Mobile data networks include very expensive hardware and software, so upgrading the capability of existing networks is not an easy thing to do. It is not economically feasible for a mobile network provider to simply replace all older equipment with new equipment due to the expense of replacing the equipment. For example, the next generation wireless network in the United States is the 4G network. Many mobile data network providers are still struggling to get their entire system upgraded to provide 3G data services. Immediately upgrading to 4G equipment is not an economically viable option for most mobile data network providers. In many locations, portions of the mobile data network are connected together by point to point microwave links. These microwave links have limited bandwidth. To significantly boost the throughput of these links requires the microwave links to be replaced with fiber optic cable but this option is very costly.

BRIEF SUMMARY

Mobile network services are performed in a mobile data network in a way that is transparent to most of the existing equipment in the mobile data network. The mobile data network includes a radio access network and a core network. A first service mechanism in the radio access network breaks out data coming from a basestation, and performs one or more mobile network services based on the broken out data. A second service mechanism in the core network performs one or more mobile network services based on the network traffic remaining after the first service mechanism performs its breakout. When data is broken out, the data is delivered at the edge of the mobile data network, which means the true activity of the channel is not visible to the core network. The reduction of data in the core network due to serving data at the edge risks causing a switch from a high-speed channel to a low-speed channel by the mechanism in the core network that performs channel speed monitoring and assignment. In order to maintain the high-speed channel, the on-going data rate for a subscriber session is monitored and channel maintenance traffic is injected towards and from the radio network controller (in both directions). The amount of channel maintenance traffic depends on thresholds that determine a desired data rate for a particular subscriber session being broken out Channel maintenance traffic is discontinued when the subscriber is inactive.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 1 is a block diagram of a prior art mobile data network;

FIG. 2 is a block diagram of a mobile data network that includes first, second and third service mechanisms that all communicate via an overlay network;

FIG. 32 is a flow diagram of a method for disabling generation of maintenance traffic when a subscriber is inactive; and FIG. 33 is a block diagram of a channel maintenance data packet.

DETAILED DESCRIPTION

Figure 3:
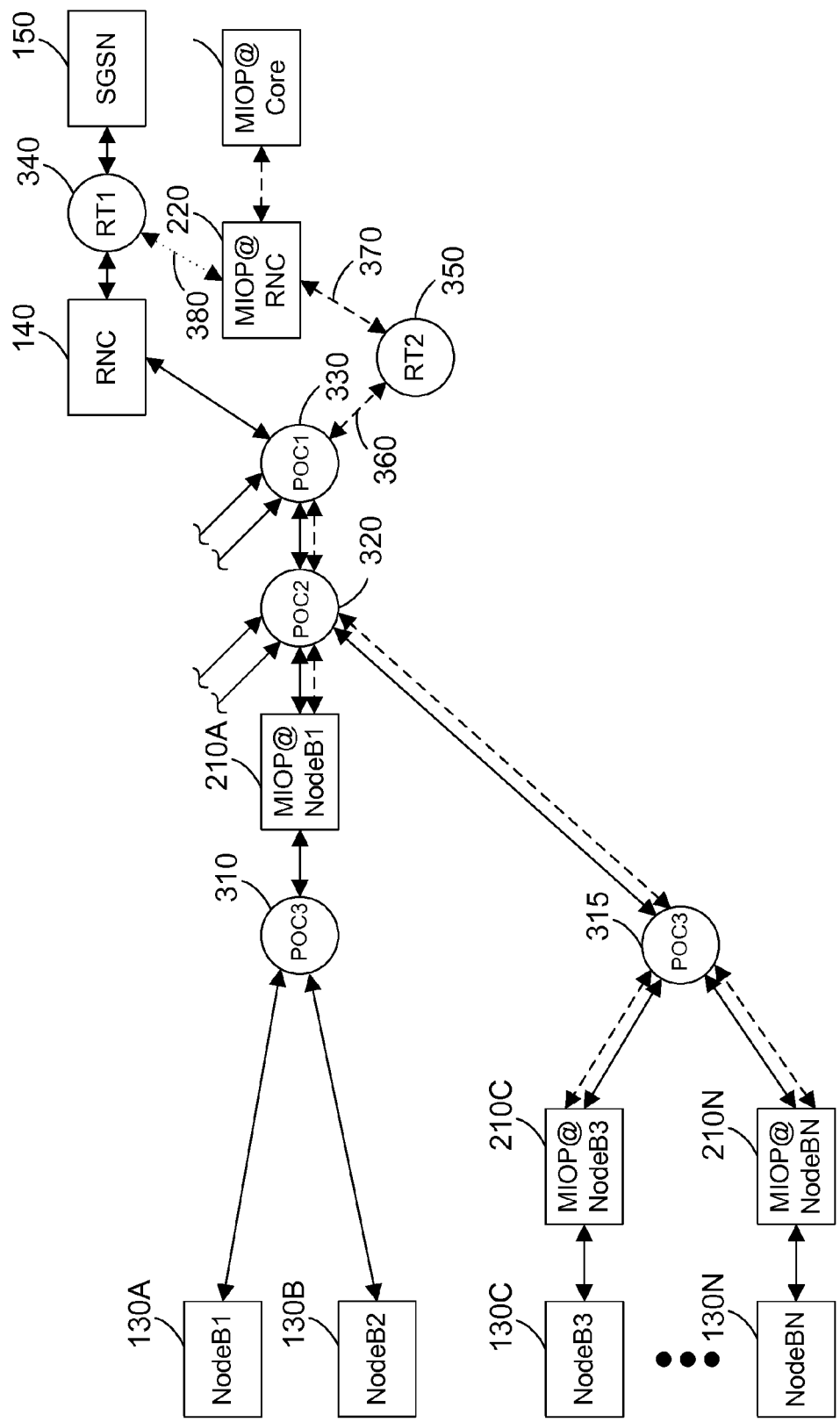
FIG. 3 is a block diagram of one possible implementation for parts of the mobile data network shown in FIG. 2 to illustrate the overlay network.

The claims and disclosure herein provide mechanisms and methods for performing mobile network services in a mobile data network within the existing infrastructure of the mobile data network. These services include serving data at the edge of the mobile data network in a way that hides the activity on a channel. When the core network detects packets on a channel less that some threshold, the core network may switch the channel type from high-speed to low-speed. To assure this does not happen when the channel is active, radio channel handlers inject both uplink and downlink channel maintenance data packets in the core network at the edge and in the core respectively. A channel type switch by the core network due to detected low activity is thus avoided by injecting channel maintenance traffic packets.

Referring to FIG. 1, a prior art mobile data network 100 is shown. Mobile data network 100 is representative of known 3G networks. The mobile data network 100 preferably includes a radio access network (RAN), a core network, and an external network, as shown in FIG. 1. The radio access network includes the tower 120, basestation 122 with its corresponding NodeB 130, and a radio interface on a radio network controller (RNC) 140. The core network includes a network interface on the radio network controller 140, the serving node 150, gateway node 160 and operator service network 170 (as part of the mobile data network). The external network includes any suitable network. One suitable example for an external network is the internet 180, as shown in the specific example in FIG. 1.

In mobile data network 100, user equipment 110 communicates via radio waves to a tower 120. User equipment 110 may include any device capable of connecting to a mobile data network, including a mobile phone, a tablet computer, a mobile access card coupled to a laptop computer, etc. The tower 120 communicates via network connection to a basestation 122. Each basestation 122 includes a NodeB 130, which communicates with the tower 120 and the radio network controller 140. Note there is a fan-out that is not represented in FIG. 1. Typically there are tens of thousands of towers 120. Each tower 120 typically has a corresponding base station 122 with a NodeB 130 that communicates with the tower. However, network communications with the tens of thousands of base stations 130 are performed by hundreds of radio network controllers 140. Thus, each radio network controller 140 can service many NodeBs 130 in basestations 122. There may also be other items in the network between the basestation 130 and the radio network controller 140 that are not shown in FIG. 1, such as concentrators (points of concentration) or RAN aggregators that support communications with many basestations.

The radio network controller 140 communicates with the serving node 150. In a typical 3G network, the serving node 150 is an SGSN, which is short for Service GPRS Support Node, where GPRS stands for general packet radio service. The serving node 150 mediates access to network resources on behalf of mobile subscribers and implements the packet scheduling policy between different classes of quality of service. It is also responsible for establishing the Packet Data Protocol (PDP) context with the gateway node 160 for a given subscriber session. The serving node 150 is responsible for the delivery of data packets from and to the basestations within its geographical service area. The tasks of the serving node 150 include packet routing and transfer, mobility management (attach/detach and location management), logical link management, and authentication and charging functions. The serving node 150 stores location information and user profiles of all subscribers registered with the serving node 150. Functions the serving node 150 typically performs include GPRS tunneling protocol (GTP) tunneling of packets, performing mobility management as user equipment moves from one basestation to the next, and billing user data.

In a typical 3G network, the gateway node 160 is a GGSN, which is short for gateway GPRS support node. The gateway node 160 is responsible for the interworking between the core network and external networks. From the viewpoint of the external networks 180, gateway node 160 is a router to a sub-network, because the gateway node 160 "hides" the core network infrastructure from the external network. When the gateway node 160 receives data from an external network (such as internet 180) addressed to a specific subscriber, it forwards the data to the serving node 150 serving the subscriber. For inactive subscribers paging is initiated. The gateway node 160 also handles routing packets originated from the user equipment 110 to the appropriate external network. As anchor point the gateway node 160 supports the mobility of the user equipment 110. In essence, the gateway node 160 maintains routing necessary to tunnel the network packets to the serving node 150 that services a particular user equipment 110.

The gateway node 160 converts the packets coming from the serving node 150 into the appropriate packet data protocol (PDP) format (e.g., IP or X.25) and sends them out on the corresponding external network. In the other direction, PDP addresses of incoming data packets from the external network 180 are converted to the address of the subscriber's user equipment 110. The readdressed packets are sent to the responsible serving node 150. For this purpose, the gateway node 160 stores the current serving node address of the subscriber and his or her profile. The gateway node 160 is responsible for IP address assignment and is the default router for the subscriber's user equipment 110. The gateway node 160 also performs authentication, charging and subscriber policy functions. One example of a subscriber policy function is "fair use" bandwidth limiting and blocking of particular traffic types such as peer to peer traffic. Another example of a subscriber policy function is degradation to a 2G service level for a prepaid subscriber when the prepaid balance is zero.

A next hop router located in the operator service network (OSN) 170 receives messages from the gateway node 160, and routes the traffic either to the operator service network 170 or via an internet service provider (ISP) towards the internet 180. The operator service network 170 typically includes business logic that determines how the subscriber can use the mobile data network 100. The business logic that provides services to subscribers may be referred to as a "walled garden", which refers to a closed or exclusive set of services provided for subscribers, including a carrier's control over applications, content and media on user equipment.

Devices using mobile data networks often need to access an external network, such as the internet 180. As shown in FIG. 1, when a subscriber enters a request for data from the internet, that request is passed from the user equipment 110 to tower 120, to NodeB 130 in basestation 122, to radio network controller 140, to serving node 150, to gateway node 160, to operator service network 170, and to internet 180. When the requested data is delivered, the data traverses the entire network from the internet 180 to the user equipment 110. The capabilities of known mobile data networks 100 are taxed by the ever-increasing volume of data being exchanged between user equipment 110 and the internet 180 because all data between the two have to traverse the entire network.

Some efforts have been made to offload internet traffic to reduce the backhaul on the mobile data network. For example, some mobile data networks include a node called a HomeNodeB that is part of the radio access network. Many homes have access to high-speed Internet, such as Direct Subscriber Line (DSL), cable television, wireless, etc. For example, in a home with a DSL connection, the HomeNodeB takes advantage of the DSL connection by routing Internet traffic to and from the user equipment directly to the DSL connection, instead of routing the Internet traffic through the mobile data network. While this may be an effective way to offload Internet traffic to reduce backhaul, the HomeNodeB architecture makes it difficult to provide many mobile network services such as lawful interception, mobility, and charging consistently with the 3G or 4G mobile data network.

Referring to FIG. 2, a mobile data network 200 includes mechanisms that provide various services for the mobile data network in a way that is transparent to most of the existing equipment in the mobile data network. FIG. 2 shows user equipment 110, tower 120, NodeB 130, radio network controller 140, serving node 150, gateway node 160, operator service node 170, and internet 180, the same as shown in FIG. 1. The additions to the mobile data network 200 when compared with the prior art mobile data network 100 in FIG. 1 include the addition of three components that may provide mobile network services in the mobile data network, along with a network management mechanism to manage the three components. The mobile network services are performed by what is called herein a Mobile Internet Optimization Platform (MIOP), and the mobile network services performed by the Mobile Internet Optimization Platform are referred to herein as MIOP services. The three MIOP components that provide these mobile network services are shown in FIG. 2 as MIOP@NodeB 210, MIOP@RNC 220 and MIOP@Core 230. A network management system shown as MIOP@NMS 240 manages the overall solution by: 1) managing the function of the three MIOP components 210, 220 and 230; 2) determining which MIOP@NodeBs in the system aggregate to which MIOP@RNCs via the overlay network for performance, fault and configuration management; and 3) monitoring performance of the MIOP@NodeBs to dynamically change and configure the mobile network services. The MIOP@NodeB 210, MIOP@RNC 220, MIOP@Core 230, MIOP@NMS 240, and the overlay network 250, and any subset of these, and are referred to herein as MIOP components.

The mobile network services provided by MIOP@NodeB 210, MIOP@RNC 220, and MIOP@Core 230 include any suitable services on the mobile data network, such as data optimizations, RAN-aware services, subscriber-aware services, edge-based application serving, edge-based analytics, etc. All mobile network services performed by all of MIOP@NodeB 210, MIOP@RNC 220, and MIOP@Core 230 are included in the term MIOP services as used herein. In addition to the services being offer in the MIOP components MIOP@NodeB 210, MIOP@RNC 220, and MIOP@Core 230, the various MIOP services could also be provided in a cloud based manner.

MIOP@NodeB 210 includes a first service mechanism and is referred to as the "edge" based portion of the MIOP solution. MIOP@NodeB 210 resides in the radio access network and has the ability to intercept all traffic to and from the NodeB 130. MIOP@NodeB 210 preferably resides in the base station 222 shown by the dotted box in FIG. 2. Thus, all data to and from the NodeB 130 to and from the radio network controller 140 is routed through MIOP@NodeB 210. MIOP@NodeB performs what is referred to herein as breakout of data on the intercepted data stream. MIOP@NodeB monitors the signaling traffic between NodeB and RNC and on connection setup intercepts in particular the setup of the transport layer (allocation of the UDP Port, IP address or AAL2 channel). For registered sessions the breakout mechanism 410 will be configured in a way that all traffic belonging to this UDP Port, IP address to AAL2 channel will be forwarded to an data offload function. MIOP@NodeB 210 thus performs breakout of data by defining a previously-existing path in the radio access network for non-broken out data, by defining a new second data path that did not previously exist in the radio access network for broken out data, identifying data received from a corresponding NodeB as data to be broken out, sending the data to be broken out on the second data path, and forwarding other data that is not broken out on the first data path. The signaling received by MIOP@NodeB 210 from NodeB 130 is forwarded to RNC 140 on the existing network connection to RNC 140, even though the data traffic is broken out. Thus, RNC 140 sees the signaling traffic and knows the subscriber session is active, but does not see the user data that is broken out by MIOP@NodeB 210. MIOP@NodeB thus performs two distinct functions depending on the monitored data packets: 1) forward the data packets to RNC 140 for signaling traffic and user data that is not broken out (including voice calls); and 2) re-route the data packets for user data that is broken out.

Once MIOP@NodeB 210 breaks out user data it can perform any suitable service based on the traffic type of the broken out data. Because the services performed by MIOP@NodeB 210 are performed in the radio access network (e.g., at the basestation 222), the MIOP@NodeB 210 can service the user equipment 110 much more quickly than can the radio network controller 140. In addition, by having a MIOP@NodeB 210 that is dedicated to a particular NodeB 130, one MIOP@NodeB only needs to service those subscribers that are currently connected via a single NodeB. The radio network controller, in contrast, which typically services dozens or even hundreds of basestations, must service all the subscribers accessing all basestations it controls from a remote location. As a result, MIOP@NodeB is in a much better position to provide services that will improve the quality of service and experience for subscribers than is the radio network controller.

Breaking out data in the radio access network by MIOP@NodeB 210 allows for many different types of services to be performed in the radio access network. These services may include optimizations that are similar to optimizations provided by known industry solutions between radio network controllers and the serving node. However, moving these optimizations to the edge of the mobile data network will not only greatly improve the quality of service for subscribers, but will also provide a foundation for applying new types of services at the edge of the mobile data network, such as terminating machine-to-machine (MTM) traffic at the edge (e.g., in the basestation), hosting applications at the edge, and performing analytics at the edge.

MIOP@RNC 220 includes a second service mechanism in mobile data network 200. MIOP@RNC 220 monitors all communication between the radio network controller 140 and serving node 150. The monitored communications are all communications to and from the radio network controller and the rest of the core network. MIOP@RNC 220 may provide one or more services for the mobile data network. MIOP@RNC 220 preferably makes the decision of whether or not to allow breakout of data. If MIOP@RNC 220 decides to breakout data for a given subscriber session, it may send a message to MIOP@NodeB 210 authorizing breakout by MIOP@NodeB 210, or may decide to breakout the data at MIOP@RNC 220, depending on the configured breakout decision criteria and selected radio channel. Because messages to and from the core network establishing the PDP context for a given subscriber session are monitored by MIOP@RNC 220, the decision of whether or not to breakout data resides in the MIOP@RNC 220.

MIOP@Core 230 includes a third service mechanism in the mobile data network 200. MIOP@Core 230 may include all the same services as MIOP@RNC 220, or any suitable subset of those services. If the decision is made not to provide services at MIOP@NodeB 210 or MIOP@RNC 220, these same services plus more sophisticated services can be performed at MIOP@Core 230. Thus, mobile data network 200 provides flexibility by allowing a decision to be made of where to perform which services. Because MIOP@NodeB 210, MIOP@RNC 220 and MIOP@Core 230 preferably include some of the same services, the services between components may interact (e.g., MIOP@NodeB and MIOP@Core may interact to optimize TCP traffic between them), or the services may be distributed across the mobile data network (e.g., MIOP@NodeB performs breakout and provides services for high-speed traffic, MIOP@RNC performs breakout and provides services for low-speed traffic, and MIOP@Core provides services for non-broken out traffic). The MIOP system architecture thus provides a very powerful and flexible solution, allowing dynamic configuring and reconfiguring on the fly of which services are performed by the MIOP components and where. In addition, these services may be implemented taking advantage of existing infrastructure in a mobile data network.

MIOP@NMS 240 is a network management system that monitors and controls the functions of MIOP@NodeB 210, MIOP@RNC 220, and MIOP@Core 230. MIOP@NMS 240 preferably includes MIOP internal real-time or near real-time performance data monitoring to determine if historical or additional regional dynamic changes are needed to improve services on the mobile data network 200. MIOP@NMS 240 provides a user interface that allows a system administrator to operate and to configure how the MIOP components 210, 220 and 230 function.

The overlay network 250 allows MIOP@NodeB 210, MIOP@RNC 220, MIOP@Core 230, and MIOP@NMS 240 to communicate with each other. The overlay network 250 is preferably a virtual private network primarily on an existing physical network in the mobile data network. Thus, while overlay network 250 is shown in FIG. 2 separate from other physical network connections, this representation in FIG. 2 is a logical representation.

FIG. 3 shows one suitable implementation of a physical network and the overlay network in a sample mobile data system. The existing physical network in the mobile data network before the addition of the MIOP@NodeB 210, MIOP@RNC 220, and MIOP@Core 230 is shown by the solid lines with arrows. This specific example in FIG. 3 includes many NodeBs, shown in FIG. 1 as 130A, 130B, 130C, . . . , 130N. Some of the NodeBs have a corresponding MIOP@NodeB. FIG. 3 illustrates that MIOP@NodeBs (such as 210A and 210N) can be placed in a basestation with its corresponding NodeB, or can be placed upstream in the network after a point of concentration (such as 210A). FIG. 3 also illustrates that a single MIOP@NodeB such as MIOP@NodeB1 210A can service two different NodeBs, such as NodeB1 130A and NodeB2 130B. Part of the overlay network is shown by the dotted lines between MIOP@NodeB 1 210A and second point of concentration POC2 320, between MIOP@NodeB3 210C and POC3 315, between MIOP@NodeBN 210N and POC3 315, and between POC3 315 and POC2 320. Note the overlay network in the radio access network portion is a virtual private network that is implemented on the existing physical network connections. The overlay network allows the MIOP@NodeBs 210A, 210C and 210N to communicate with each other directly, which makes some services possible in the mobile data network 200 that were previously impossible. FIG. 3 shows MIOP@NodeB1 210A connected to a second point of concentration POC2 320. The broken arrows coming in from above at POC2 320 represent connections to other NodeBs, and could also include connections to other MIOP@NodeBs. Similarly, POC2 320 is connected to a third point of concentration POC1 330, with possibly other NodeBs or MIOP@NodeBs connected to POC1. The RNC 140 is shown connected to POC1 330, and to a first router RT1 340 in the core network. The router RT1 340 is also connected to the SGSN 150. While not shown in FIG. 3 for the sake of simplicity, it is understood that SGSN in FIG. 3 is also connected to the upstream core components shown in FIG. 2, including GGSN 160, OSN 170 and internet 180.

As shown in FIG. 3, the overlay network from the NodeBs to POC1 330 is a virtual private network implemented on existing physical network connections. However, the overlay network requires a second router RT2 350, which is connected via a physical network connection 360 to POC1 330, and is connected via physical network connection 370 to MIOP@RNC 220. This second router RT2 350 may be a separate router, or may be a router implemented within MIOP@RNC 220. MIOP@RNC 220 is also connected to router RT1 340 via a physical network connection 380, and is also connected to MIOP@Core 230. Physical connection 380 in FIG. 3 is shown in a line with short dots because it is not part of the pre-existing physical network before adding the MIOP components (arrows with solid lines) and is not part of the overlay network (arrows with long dots). Note the connection from MIOP@RNC 220 to MIOP@Core 230 is via existing physical networks in the core network.

We can see from the configuration of the physical network and overlay network in FIG. 3 that minimal changes are needed to the existing mobile data network to install the MIOP components. The most that must be added is one new router 350 and three new physical network connections 360, 370 and 380. Once the new router 350 and new physical network connections 360, 370 and 380 are installed, the router 350 and MIOP components are appropriately configured, and the existing equipment in the mobile data network is configured to support the overlay network, the operation of the MIOP components is completely transparent to existing network equipment.

As can be seen in FIG. 3, data on the overlay network is defined on existing physical networks from the NodeBs to POC1. From POC1 the overlay network is on connection 360 to RT2 350, and on connection 370 to MIOP@RNC 220. Thus, when MIOP@NodeB 210 in FIG. 2 needs to send a message to MIOP@RNC 220, the message is sent by sending packets via a virtual private network on the physical network connections to POC1, then to RT2 350, then to MIOP@RNC 220. Virtual private networks are well-known in the art, so they are not discussed in more detail here.

Figure 4:
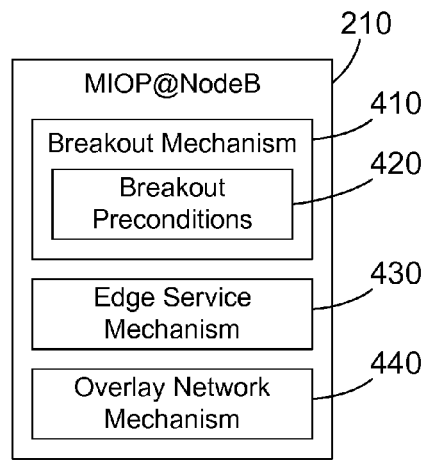
FIG. 4 is a block diagram of the MIOP@NodeB shown in FIG. 2, which includes a first service mechanism.

Referring to FIG. 4, MIOP@NodeB 210 preferably includes a breakout mechanism 410, an edge service mechanism 430, and an overlay network mechanism 440. The breakout mechanism 410 determines breakout preconditions 420 that, when satisfied, allow breakout to occur at this edge location. Breakout mechanism 410 in MIOP@NodeB 210 communicates with the breakout mechanism 510 in MIOP@RNC 220 shown in FIG. 5 to reach a breakout decision. The breakout mechanism 410, after receiving a message from MIOP@RNC 220 authorizing breakout on connection setup intercepts in particular the setup of the transport layer (allocation of the UDP Port, IP address or AAL2 channel). For authorized sessions the breakout mechanism 410 will be configured in a way that all traffic belonging to this UDP Port, IP address to AAL2 channel will be forwarded to an data offload function. For traffic that should not be broken out, the breakout mechanism 410 sends the data on the original data path in the radio access network. In essence, MIOP@NodeB 210 intercepts all communications to and from the basestation 130, and can perform services "at the edge", meaning at the edge of the radio access network that is close to the user equipment 110. By performing services at the edge, the services to subscribers may be increased or optimizes without requiring hardware changes to existing equipment in the mobile data network.

The breakout mechanism 410 preferably includes breakout preconditions 420 that specify one or more criterion that must be satisfied before breakout of data is allowed. One suitable example of breakout preconditions is the speed of the channel. In one possible implementation, only high-speed channels will be broken out at MIOP@NodeB 210. Thus, breakout preconditions 420 could specify that subscribers on high-speed channels may be broken out, while subscribers on low-speed channels are not broken out at MIOP@NodeB 210. When the breakout preconditions 420 are satisfied, the MIOP@NodeB 210 registers the subscriber session with MIOP@RNC 220. This is shown in method 800 in FIG. 8. MIOP@NodeB 210 intercepts and monitors network traffic to and from NodeB (basestation) (step 810). When the traffic does not satisfy the breakout preconditions (step 820=NO), method 800 returns to step 810. When the traffic satisfies the breakout conditions (step 820=YES), MIOP@NodeB 210 sends a message to MIOP@RNC 220 on the overlay network 250 to register the subscriber session for breakout (step 830). With the subscriber session registered with MIOP@RNC 220, the MIOP@RNC 220 will determine whether or not to breakout data for the subscriber session, and where the breakout is done, as explained in more detail below.

Referring back to FIG. 4, MIOP@NodeB 210 also includes an edge service mechanism 430. The edge service mechanism 430 provides one or more services for the mobile data network 200. The edge service mechanism 430 may include any suitable service for the mobile data network including without limitation caching of data, data or video compression techniques, push-based services, charging, application serving, analytics, security, data filtering, new revenue-producing services, etc. The edge service mechanism is the first of three service mechanisms in the MIOP components. While the breakout mechanism 410 and edge service mechanism 430 are shown as separate entities in FIG. 4, the first service mechanism could include both breakout mechanism 410 and edge service mechanism 430.

MIOP@NodeB 210 also includes an overlay network mechanism 440. The overlay network mechanism 440 provides a connection to the overlay network 250 in FIG. 2, thereby allowing MIOP@NodeB 210 to communicate with MIOP@RNC 220, MIOP@Core 230, and MIOP@NMS 240. As stated above, the overlay network 250 is preferably a virtual private network primarily on an existing physical network in the mobile data network 200.

Figure 5:
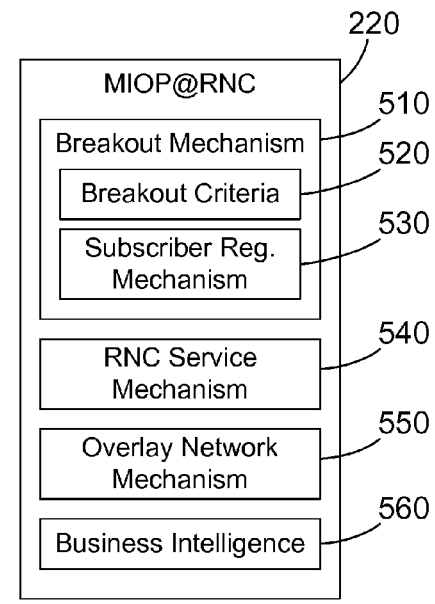
FIG. 5 is a block diagram of the MIOP@RNC shown in FIG. 2, which includes a second service mechanism.
Figure 8:
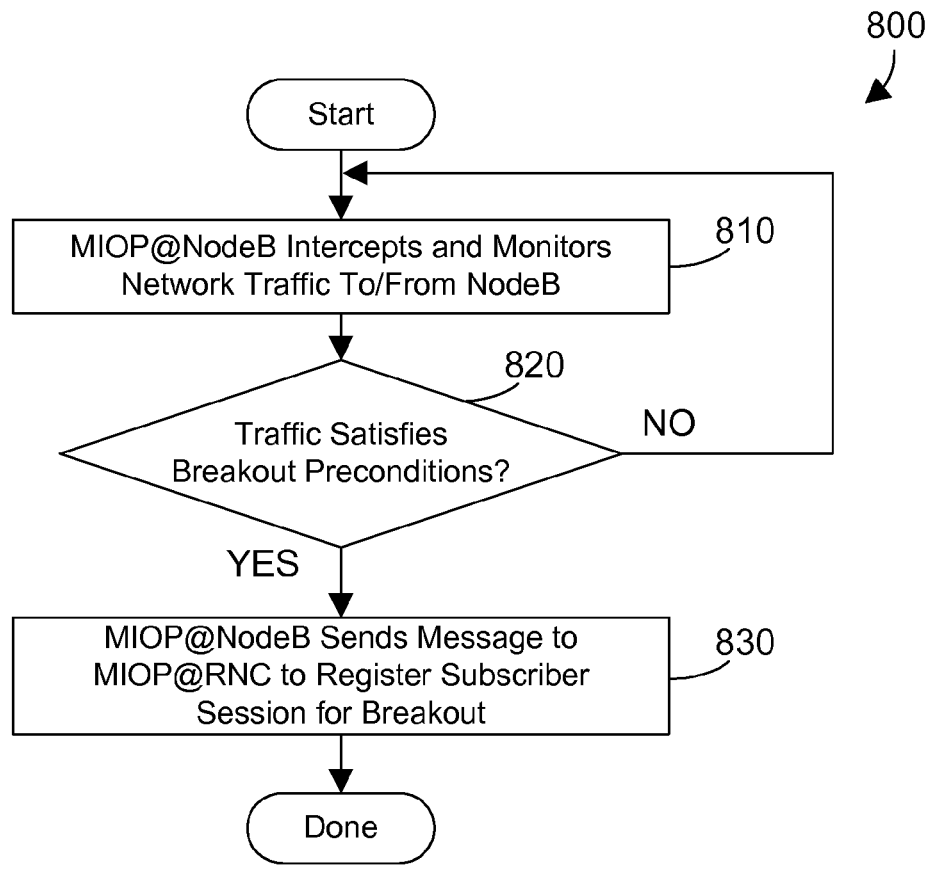
FIG. 8 is a flow diagram of a method performed by MIOP@NodeB shown in FIGS. 2 and 4.

Referring to FIG. 5, MIOP@RNC 220 preferably includes a breakout mechanism 510, an RNC service mechanism 540, an overlay network mechanism 550, and business intelligence 560. Breakout mechanism 510 includes breakout criteria 520 that specifies one or more criterion that, when satisfied, allows breakout of data. Subscriber registration mechanism 530 receives messages from MIOP@NodeB 210, and registers subscriber sessions for which the breakout preconditions 420 in MIOP@NodeB 210 are satisfied. When the breakout mechanism 510 determines the breakout criteria 520 is satisfied, the breakout mechanism 510 will then determine where the breakout should occur. When the breakout can occur at MIOP@NodeB 210, the MIOP@RNC 220 sends a message to MIOP@NodeB 210 on the overlay network 250 authorizing breakout at MIOP@NodeB 210. When the breakout should occur at MIOP@RNC 220, the breakout mechanism 510 in MIOP@RNC 220 performs the breakout as well for the traffic remaining then). This is shown in more detail in method 1000 in FIG. 10. MIOP@RNC monitors network traffic between the radio network controller 140 and the serving node 150 (step 1010). When the traffic does not satisfy the breakout criteria (step 1020=NO), method 1000 loops back to step 1010. When the network traffic satisfies the breakout criteria (step 1020=YES), the breakout mechanism 510 determines whether the subscriber session is registered for breakout (step 1030). A subscriber session is registered for breakout when the MIOP@NodeB 210 determined the traffic satisfied the breakout preconditions and registered the subscriber session for breakout, as shown in FIG. 8. Returning to FIG. 10, when the subscriber is registered for breakout (step 1030=YES), MIOP@RNC 220 sends a message via the overlay network 250 to MIOP@NodeB 210 authorizing breakout of traffic for the subscriber session (step 1040). MIOP@NodeB 210 may then breakout traffic for the subscriber session (step 1050). When the subscriber is not registered for breakout (step 1030=NO), method 1000 checks to see if MIOP@RNC is going to do breakout (step 1060). If not (step 1060=NO), method 1000 is done. When MIOP@RNC is going to do breakout (step 1060=YES), the traffic is then broken out at MIOP@RNC (step 1070).

Figure 10:
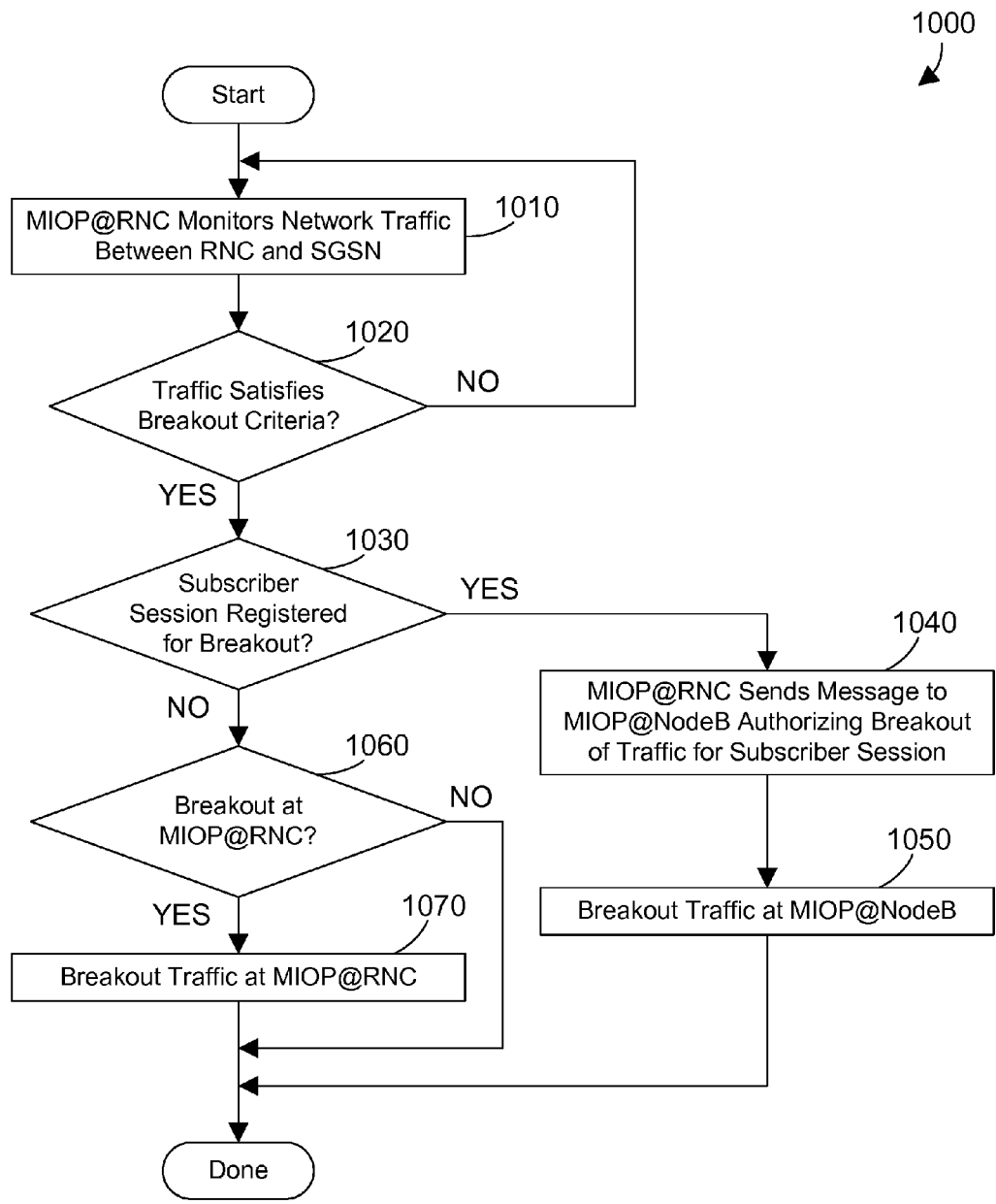
FIG. 10 is a flow diagram of a method for the MIOP@NodeB and MIOP@RNC to determine when to break out data.

In one specific example, the breakout preconditions specify only high-speed channels are broken out at MIOP@NodeB 210, and when the breakout preconditions are satisfied, the subscriber session is registered for breakout, as shown in FIG. 8. FIG. 10 illustrates that even when the breakout preconditions are not satisfied, breakout can still be performed at MIOP@RNC 220. Thus, even if the subscriber session is on a low-speed channel, if all the other breakout criteria are satisfied, breakout of the low-speed channel may be performed at MIOP@RNC 220. The mobile data network 200 thus provides great flexibility in determining when to do breakout and where.

Referring back to FIG. 5, the RNC service mechanism 540 provides one or more services for the mobile data network. RNC service mechanism 540 is the second of three service mechanisms in the MIOP components. The RNC service mechanism 540 may include any suitable service for the mobile data network, including without limitation caching of data, data or video compression techniques, push-based services, charging, application serving, analytics, security, data filtering, new revenue-producing services, etc. While the breakout mechanism 510 and RNC service mechanism 540 are shown as separate entities in FIG. 5, the second service mechanism could include both breakout mechanism 510 and RNC service mechanism 540. The overlay network mechanism 550 is similar to the overlay network mechanism 440 in FIG. 4, providing a logical network connection to the other MIOP components on the overlay network 250 in FIG. 2. MIOP@RNC 220 also includes business intelligence 560, which includes:

1) historical subscriber information received from the mobile data network over time, such as mobility and location, volumes, traffic types, equipment used, etc.
2) network awareness, including NodeB load states, service area code, channel type, number of times channel type switching occurred for a PDP session, serving cell ID, how many cells and their IDs are in the active set, PDP context type, PDP sessions per subscriber, session duration, data consumption, list of Uniform Resource Locators (URLs) browsed for user classification, top URL browsed, first time or repeat user, entry point/referral URLs for a given site, session tracking, etc.
3) association of flow control procedures between NodeB and RNC to subscribers.

The business intelligence 560 may be instrumented by the RNC service mechanism 540 to determine when and what types of MIOP services to perform for a given subscriber. For example, services for a subscriber on a mobile phone may differ when compared to services for a subscriber using a laptop computer to access the mobile data network. In another example, voice over internet protocol (VOIP) session could have the data broken out.

Figure 6:
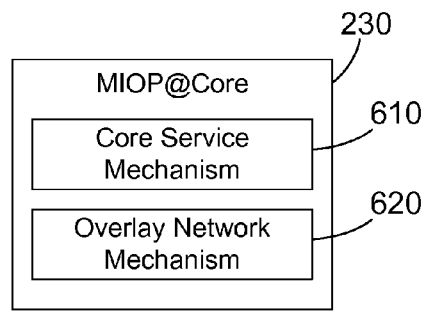
FIG. 6 is a block diagram of the MIOP@Core shown in FIG. 2, which includes a third service mechanism.

Referring to FIG. 6, the MIOP@Core 230 includes a core service mechanism 610 and an overlay network mechanism 620. Core service mechanism 610 provides one or more services for the mobile data network. Core service mechanism 610 is the third of three service mechanisms in the MIOP components. The core service mechanism 610 may include any suitable service for the mobile data network, including without limitation caching of data, data or video compression techniques, push-based services, charging, application serving, analytics, security, data filtering, new revenue-producing services, etc. In one specific implementation, the MIOP@Core 230 is an optional component, because all needed services could be performed at MIOP@NodeB 210 and MIOP@RNC 220. In an alternative implementation, MIOP@Core 230 performs some services, while MIOP@RNC performs others or none. The overlay network mechanism 620 is similar to the overlay network mechanisms 440 in FIGS. 4 and 550 in FIG. 5, providing a logical network connection to the other MIOP components on the overlay network 250 in FIG. 2.

Figure 7:
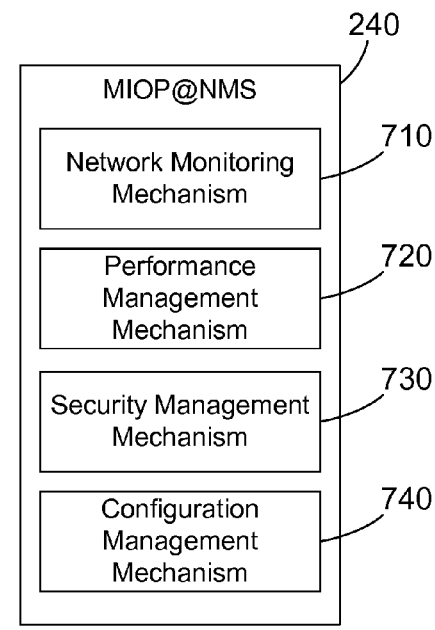
FIG. 7 is a block diagram of a management mechanism coupled to the overlay network that manages the functions of MIOP@NodeB, MIOP@RNC, and MIOP@Core.

Referring to FIG. 7, the MIOP@NMS 240 is a network management system that monitors and manages performance of the mobile data network 200, and controls the function of MIOP@NodeB 210, MIOP@RNC 220, and MIOP@Core 230. MIOP@NMS 240 preferably includes a network monitoring mechanism 710, a performance management mechanism 720, a security management mechanism 730, and a configuration management mechanism 740. The network monitoring mechanism 710 monitors network conditions, such as alarms, in the mobile data network 200. The performance management mechanism 720 can enable, disable or refine certain services by supporting the execution of services in real-time or near real-time, such as services that gather information to assess customer satisfaction. The security management mechanism 730 manages security issues in the mobile data network, such as intrusion detection or additional data privacy. The configuration management mechanism 740 controls and manages the configuration of MIOP@NodeB 210, MIOP@RNC 220, and MIOP@Core 230 in a way that allows them to dynamically adapt to any suitable criteria, including data received from the network monitoring mechanism, time of day, information received from business intelligence 560, etc.

Figure 9:
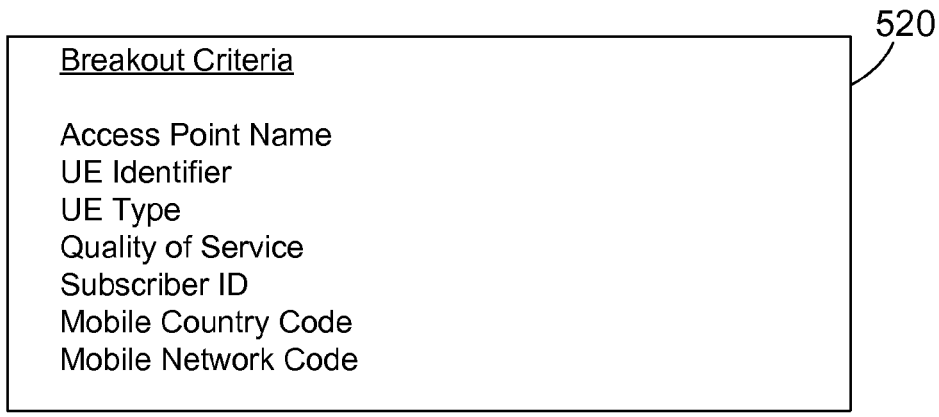
FIG. 9 is a block diagram showing breakout criteria MIOP@RNC may use in making a decision of whether or not to break out data.
Figure 11:
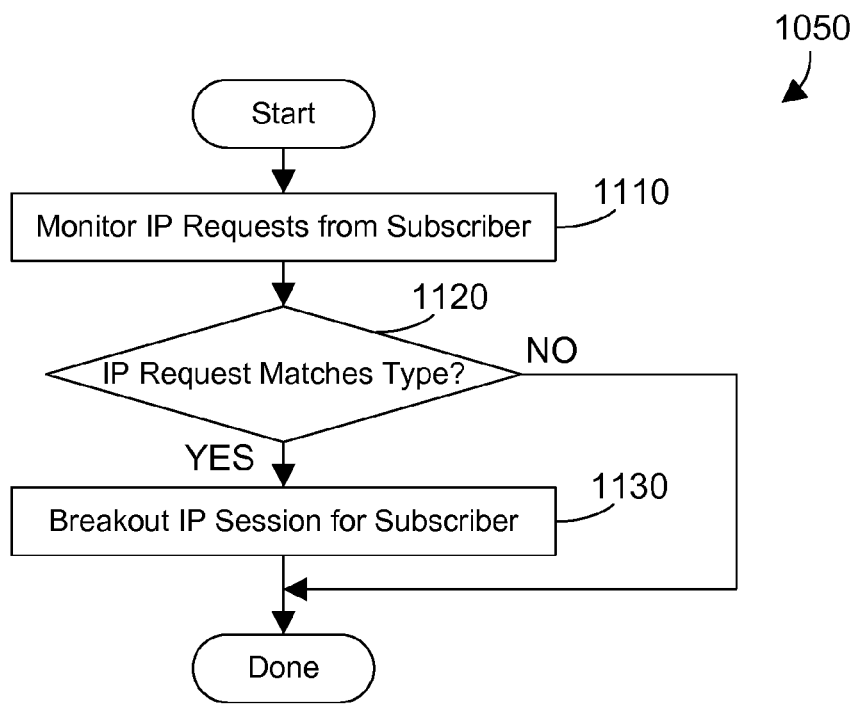
FIG. 11 is a flow diagram of a method for the first service mechanism in MIOP@NodeB to selectively break out data when break out for a specified subscriber session has been authorized.

FIG. 9 shows sample breakout criteria 520 shown in FIG. 5 and used in step 1020 in FIG. 10. Suitable breakout criteria 520 includes access point name, user equipment identifier, user equipment type, quality of service, subscriber ID, mobile country code, and mobile network code. For example, breakout criteria 520 could specify to perform MIOP services for the operator's subscribers, and not to perform MIOP services for roamers. In another example, the breakout criteria 520 could specify to break out only video requests. A static breakout decision will be performed during PDP Context Activation. Based on IP flows (e.g. shallow packet inspection of the IP 5 tuple) only specific IP flows maybe identified and broken out dynamically within that PDP subscriber session (e.g., VOIP traffic), as discussed in more detail below with respect to FIG. 11. Breakout criteria 520 expressly extends to any suitable criteria for making the breakout decision.

Referring again to FIG. 10, when the traffic satisfies the breakout criteria (step 1020=YES), and the subscriber session is registered for breakout (step 1030=YES), MIOP@RNC sends a message to MIOP@NodeB authorizing breakout of traffic for this subscriber session (step 1040). In response, MIOP@NodeB begins decrypting the bearer, examining the signaling and user IP traffic tunneled through it and may breakout the traffic for this subscriber session (step 1050). Note, however, MIOP@NodeB may still decide not to breakout all traffic based on other criteria, such as type of IP request the destination of the traffic or the ISO Layer 7 Application of the decrypted user traffic. Determination of the Application may be performed simply by inspection of the IP 5-tuple or optionally via inspection at layer 7 using Deep Packet Inspection (DPI) techniques. This is shown in the specific example in FIG. 11. Method 1050 in FIG. 10 is one suitable implementation of step 1050 in FIG. 10. MIOP@NodeB monitors IP requests from the subscriber (step 1110). When the user traffic IP request matches a specified type criteria (step 1120=YES), the IP session is broken out for the subscriber (step 1130). When the IP request does not match a specified criteria type (step 1120=NO), no breakout is performed. For example, let's assume that IP requests to access video over the RTP layer 7 Application Protocol are broken out so the video data may be cached in MIOP@NodeB 210, but other requests, such as Google searches, are not. The MIOP@NodeB monitors the IP requests from the subscriber (step 1110), and when the subscriber session IP request carries RTP traffic is for a video file (step 1120=YES), the IP session is broken out (step 1130). Otherwise, the IP session is not broken out at MIOP@NodeB. This is one simple example to illustrate additional flexibility and intelligence within MIOP@NodeB that may determine whether or not to perform breakout for a given subscriber session at the MIOP@NodeB after being authorized by MIOP@RNC to perform breakout for that subscriber session. Any suitable criteria could be used to determine what to breakout and when at MIOP@NodeB once MIOP@NodeB has been authorized for breakout in step 1040 in FIG. 10.

Figure 12:
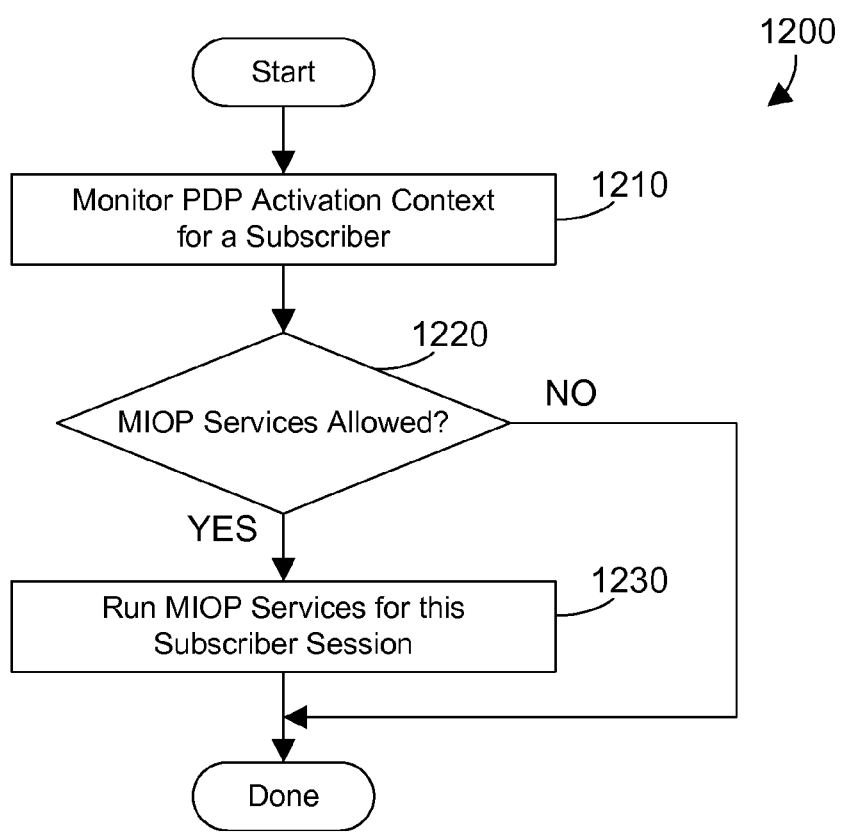
FIG. 12 is a flow diagram of a method for determining when to run MIOP services for a specified subscriber session.

Referring to FIG. 12, method 1200 shows a method for determining when to run MIOP services. The Packet Data Protocol (PDP) activation context for a subscriber is monitored (step 1210). A PDP activation context is established when user equipment 110 connects to tower 120 and the subscriber runs an application that triggers the PDP activation procedure. The core network will determine the subscriber, and perhaps corresponding user equipment. When MIOP services are allowed (step 1220=YES), services for this subscriber session are run (step 1230) upon the arrival of data from the subscriber. When MIOP services are not allowed (step 1220=NO), no MIOP services are run. In one simple example, MIOP services in the mobile data network are allowed for authorized subscribers, but are not allowed for subscribers from a different wireless company that are roaming.

Figure 13:
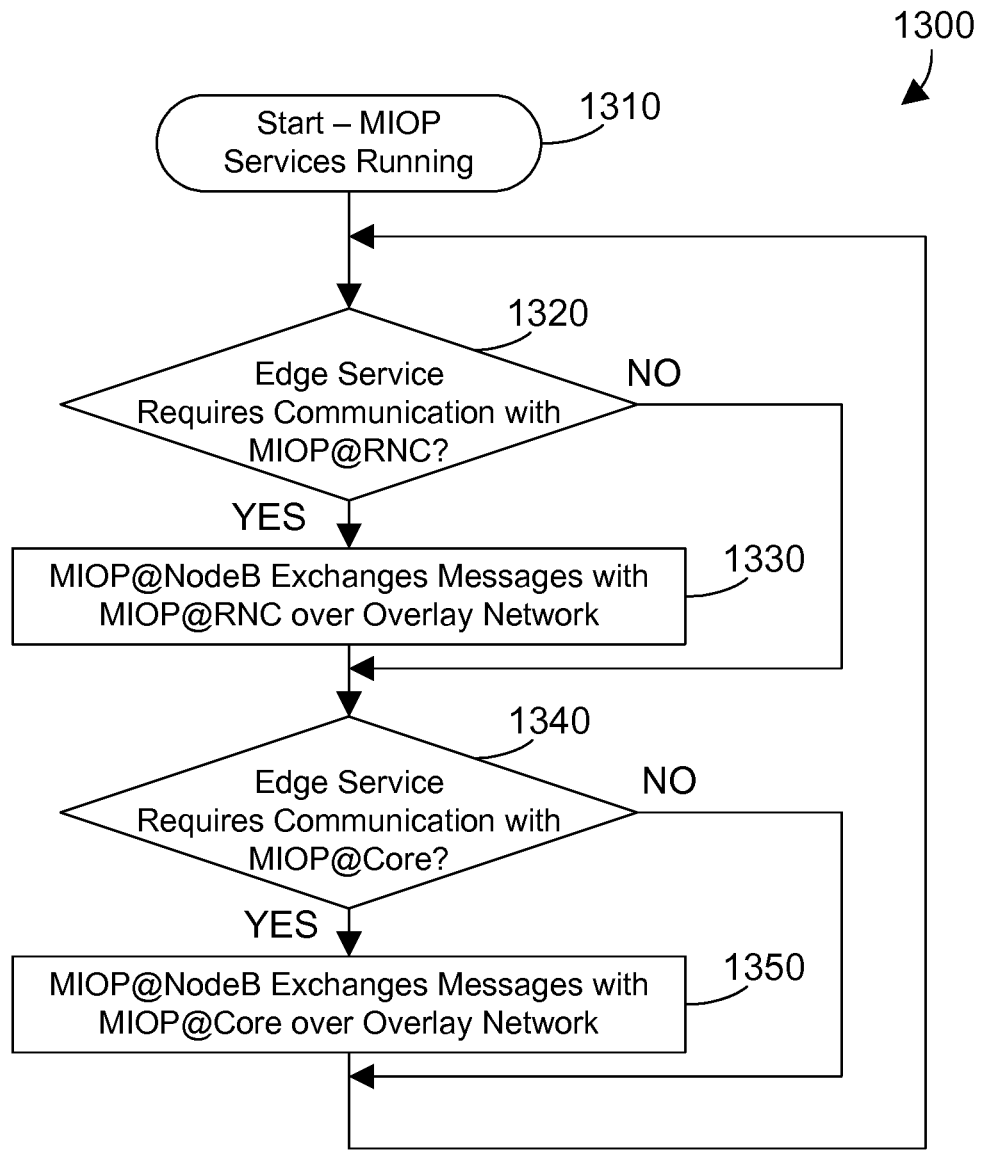
FIGS. 13-15 are flow diagrams that each show communications between MIOP components when MIOP services are running.

MIOP services may require communicating between MIOP components on the overlay network. Referring to FIG. 13, a method 1300 shows communications by MIOP@NodeB when MIOP services are running (step 1310). When the edge service mechanism requires communication with MIOP@RNC (step 1320=YES), MIOP@NodeB exchanges messages with MIOP@RNC over the overlay network (step 1330). When the edge service mechanism requires communication with MIOP@Core (step 1340=YES), MIOP@NodeB exchanges messages with MIOP@Core over the overlay network (step 1350). The overlay network thus allows the various MIOP components to communicate with each other when MIOP services are running.

Figure 14:
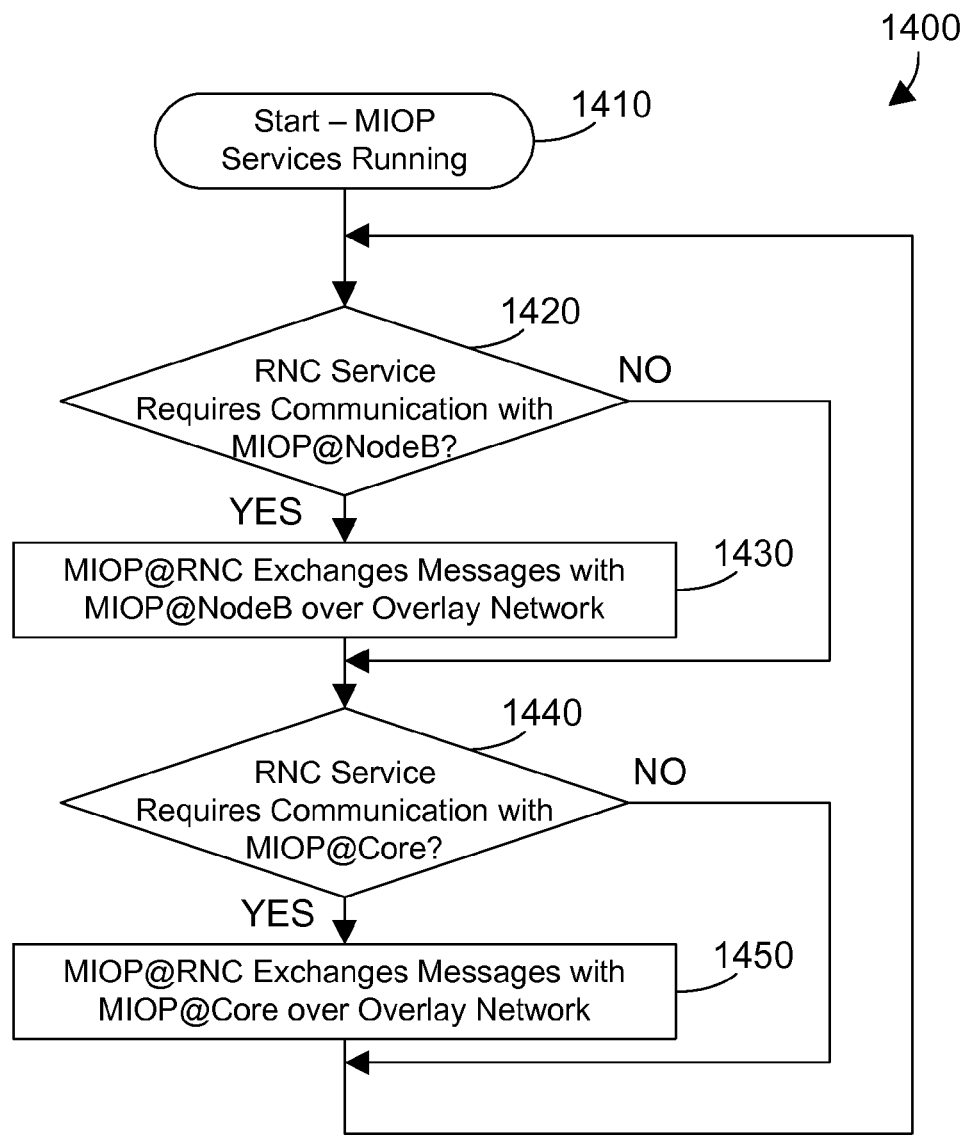

FIG. 14 shows a method 1400 that shows communications by MIOP@RNC when MIOP services are running (step 1410). When the RNC service mechanism requires communication with MIOP@NodeB (step 1420=YES), MIOP@RNC exchanges messages with MIOP@NodeB over the overlay network (step 1430). When the RNC service mechanism requires communication with MIOP@Core (step 1440=YES), MIOP@RNC exchanges messages with MIOP@Core over the overlay network (step 1450).

Figure 15:
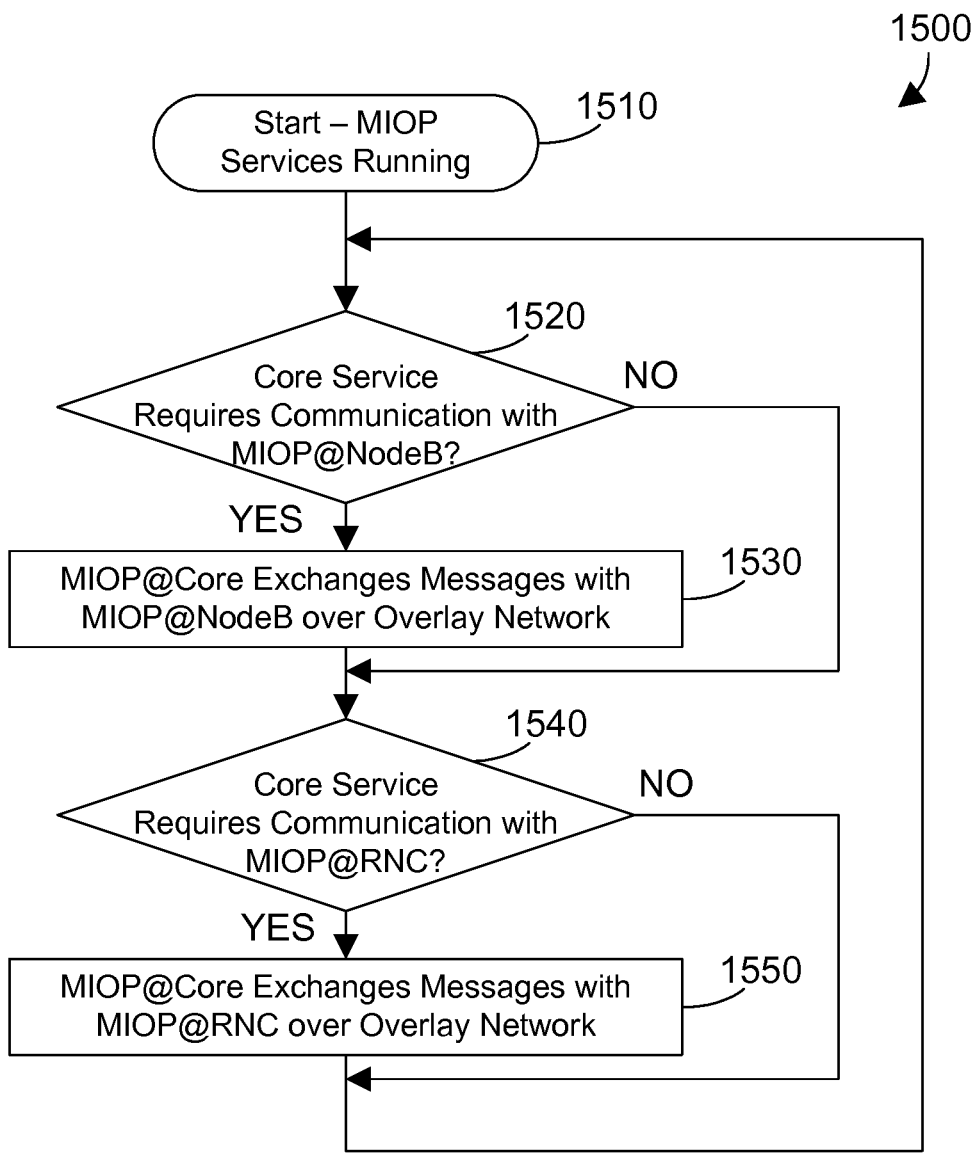

FIG. 15 shows a method 1500 that shows communications by MIOP@Core when MIOP services are running (step 1510). When the core service mechanism requires communication with MIOP@NodeB (step 1520=YES), MIOP@Core exchanges messages with MIOP@NodeB over the overlay network (step 1530) relayed via MIOP@RNC. When the core service mechanism requires communication with MIOP@RNC (step 1540=YES), MIOP@Core exchanges messages with MIOP@RNC over the overlay network (step 1550).

Figure 16:
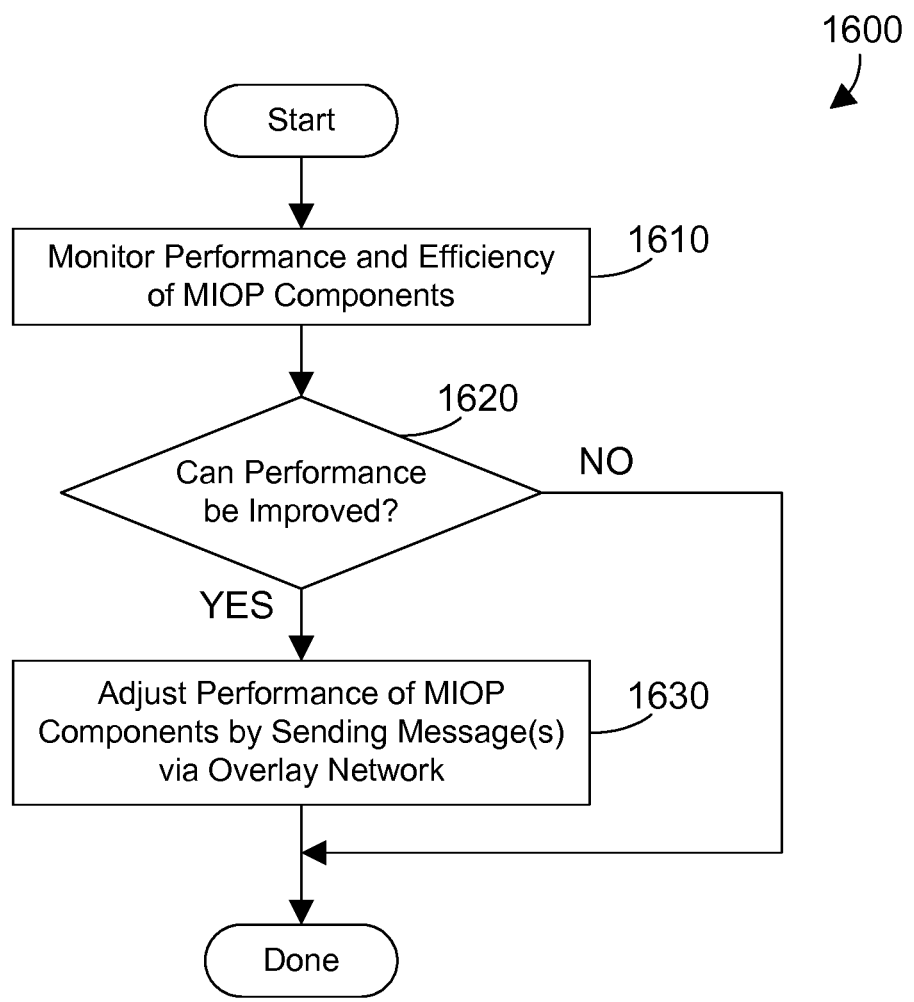
FIG. 16 is a flow diagram of a method for managing and adjusting the MIOP components.

FIG. 16 shows a method 1600 that is preferably performed by MIOP@NMS 240 in FIGS. 2 and 7. The performance and efficiency of the MIOP components that perform MIOP services are monitored (step 1610). The MIOP components that perform MIOP services may include MIOP@NodeB 210, MIOP@RNC 220, and MIOP@Core 230, assuming all of these components are present in the mobile data network 200. When performance may be improved (step 1620=YES), the performance of the MIOP components is adjusted (if implemented and applicable) by sending one or more network messages via the overlay network (step 1630). Note also a human operator could also manually reconfigure the MIOP components to be more efficient.

Figure 17:
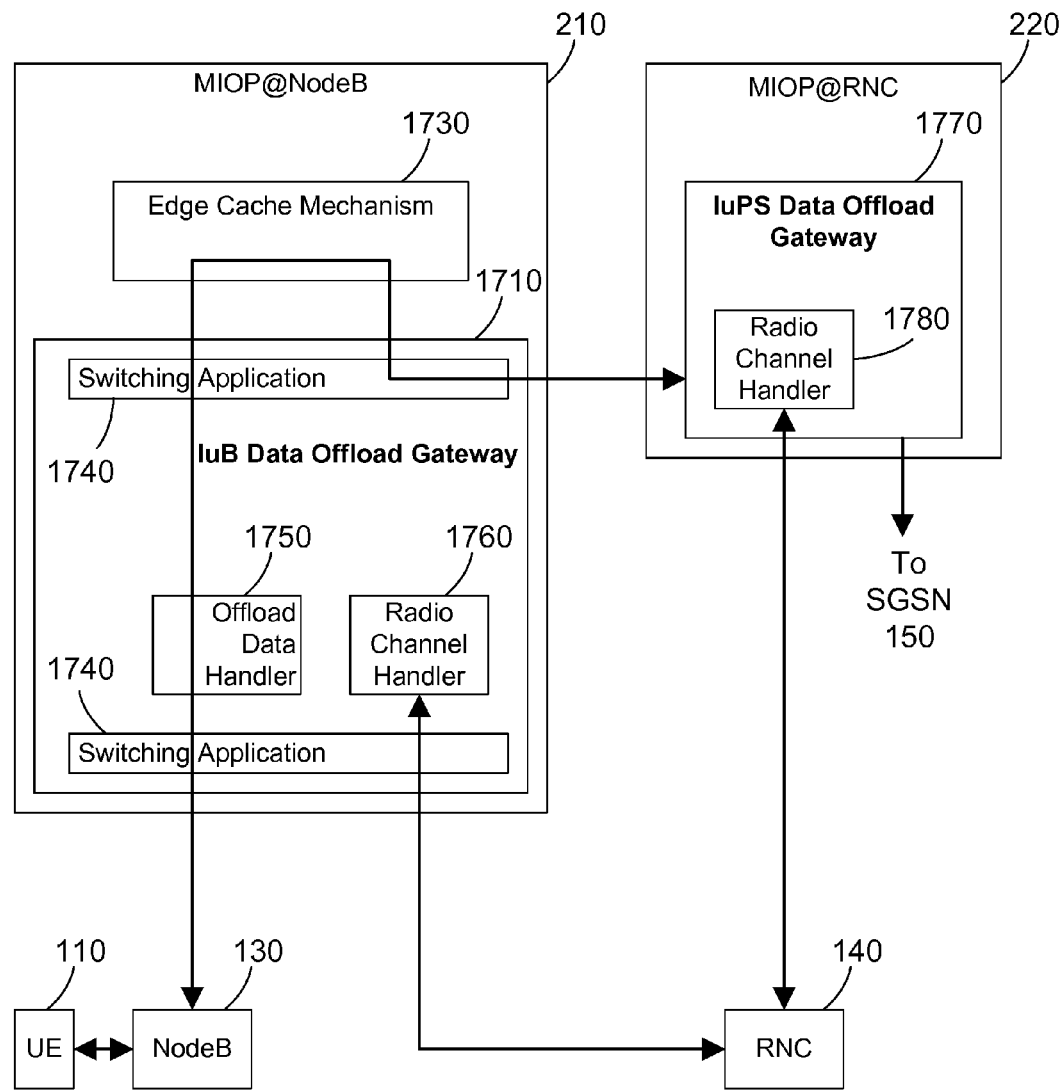
FIG. 17 is a block diagram of one specific implementation for MIOP@NodeB and MIOP@RNC.

Referring to FIG. 17, implementations for MIOP@NodeB 210 and MIOP@RNC 220 are shown by way of example. Other implementations are possible within the scope of the disclosure and claims herein. User equipment 110 is connected to NodeB 130. Note the antenna 120 shown in FIG. 2 is not shown in FIG. 17, but is understood to be present to enable the communication between user equipment 110 and NodeB 130. MIOP@NodeB 210 includes an edge cache mechanism 1730, which is one suitable example of edge service mechanism 430 in FIG. 4. MIOP@NodeB 210 includes an interface referred to herein as IuB Data Offload Gateway (IuB DOGW) 1710. This gateway 1710 implements the breakout mechanism 410 according to one or more specified breakout preconditions 420 shown in FIG. 4. IuB DOGW 1710 includes a switching application 1740, an offload data handler 1750, and a radio channel handler 1760. The switching application 1740 is responsible for monitoring data packets received from NodeB 130, forwards according to it configuration the broken out data packets to the offload data handler, relays the non-broken out data packets and control system flows to the RNC 140 via the original connections in the RAN. While switching application 1740 is shown as two separate boxes in FIG. 17, this is done to visually indicate the switching application 1740 performs switching on two different interfaces, the network interface and overlay network interface, but the switching application 1740 is preferably a single entity.

When a breakout decision is made and MIOP@RNC 220 sends a message to MIOP@NodeB 210 authorizing breakout (see step 1040 in FIG. 10), when MIOP@NodeB decides to breakout specified user data, the specified user data received by the switching application 1740 from NodeB 130 is broken out, which means the switching application 1740 routes the specified user data to the offload data handler 1750 so the broken out data is routed to the data path defined for breakout data. The offload data handler 1750 may send the data to the edge cache mechanism 1730 for processing, which can route the data directly to MIOP@RNC 220 via the overlay network, as shown by the path with arrows going from NodeB 130 to MIOP@RNC 220.

User data that is not broken out and signaling traffic is routed directly back by the switching application 1740 to RNC. In this manner, non-broken out data and signaling traffic passes through the IuB DOGW 1710 to RNC 140, while broken out data is routed by the IuB DOGW 1710 to a different destination. Note that edge cache mechanism 1730 may send messages to MIOP@RNC 220 as shown in FIG. 17, but the broken out messages themselves are not sent to MIOP@RNC 220.

MIOP@RNC 220 includes an interface referred to herein as IuPS data offload gateway (IuPS DOGW) 1770. IuPS DOGW 1770 forwards all signaling and non-broken out data traffic from RNC 140 to SGSN 150 via the GTP tunnel. IuPS DOGW 1770 includes the breakout mechanism 510, breakout criteria 520 and subscriber registration mechanism 530 shown in FIG. 5 and discussed above with reference to FIG. 5. IuPS DOGW 1770 may exchange messages with IuB DOGW 1710 via the overlay network to perform any needed service in MIOP@NodeB 210 or MIOP@RNC 220. For the specific implementation shown in FIG. 17, while the IuPS DOGW 1770 in MIOP@RNC 220 does not include an offload data handler, the IuPS DOGW 1770 could include an offload data handler and switching application similar to those shown in MIOP@NodeB 210 when MIOP@RNC 220 also needs to perform breakout of data.

The IuPS DOGW 1770 includes a radio channel handler 1780. The radio channel handlers 1760 in MIOP@NodeB 210 and 1780 in MIOP@RNC 220 monitor data traffic to and from RNC 140 related to a broken out subscriber session and provide a keep-alive channel maintenance mechanism.

Figure 18:
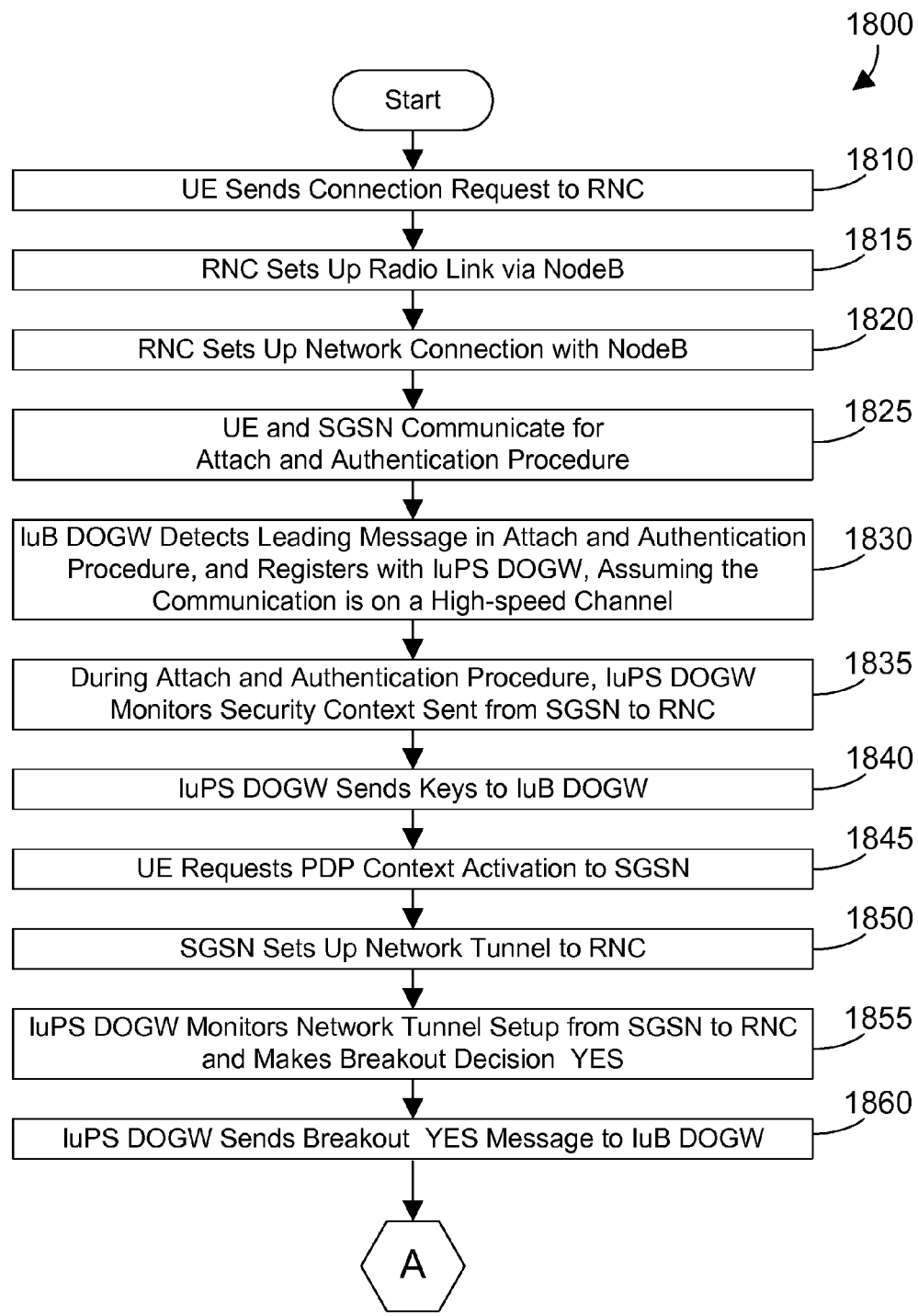
FIGS. 18 and 19 show a flow diagram of a first method for the specific implementation shown in FIG. 17.
Figure 19:
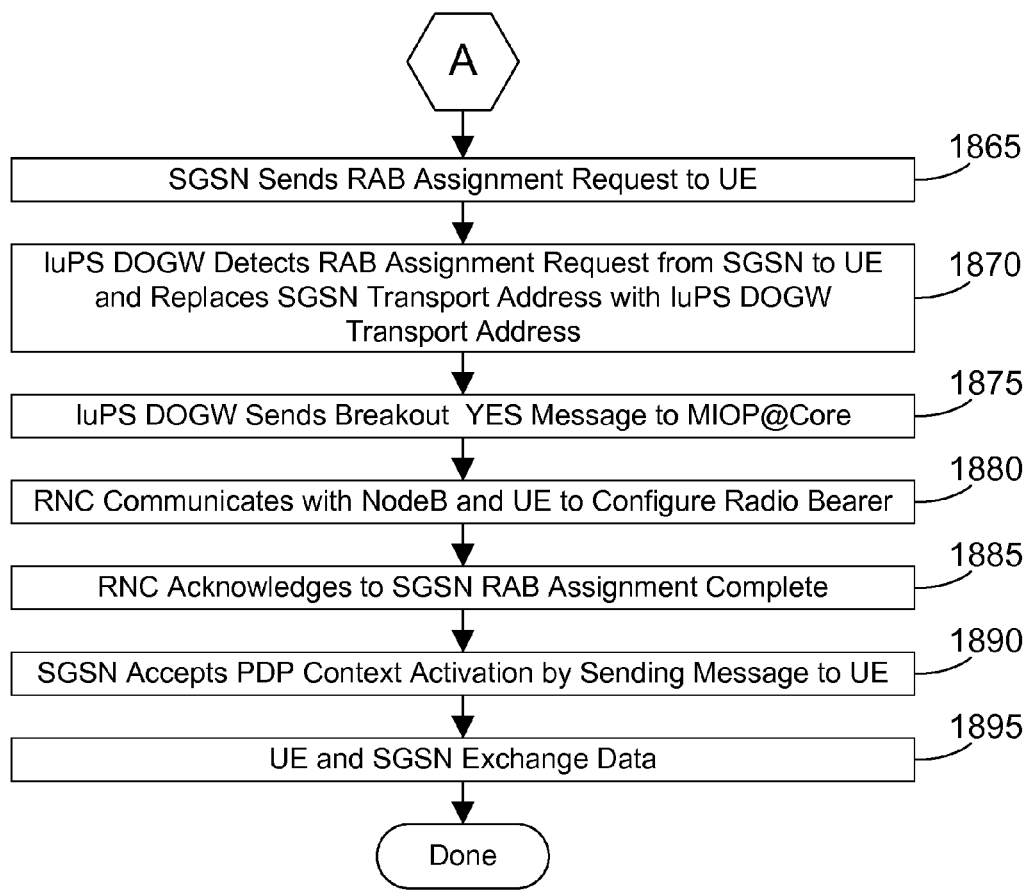

Specific methods are shown in FIGS. 18-21 that illustrate how the specific implementation in FIG. 17 could be used. FIGS. 18 and 19 show a method 1800 for setting up breakout of data. The UE sends a connection request to the RNC (step 1810). The RNC sets up a radio link via NodeB (step 1815). The RNC then sets up a network connection with NodeB (step 1820). The UE and SGSN then communicate for the attach and authentication procedure (step 1825). IuB DOGW detects the leading message in the attach and authentication procedure, and registers the subscriber session with IuPS DOGW when preconditions are fulfilled (e.g. UE is capable to carry high speed traffic) (step 1830). During the attach and authentication procedure, IuPS DOGW monitors the security context sent from SGSN to RNC (step 1835). IuPS DOGW then sends keys to IuB DOGW (step 1840). These keys are needed to decipher the upcoming signaling and UL user data and to cipher the DL user data. UE then requests PDP context activation to SGSN (step 1845). In response, SGSN sets up a network tunnel to RNC (step 1850). IuPS DOGW monitors network tunnel setup from SGSN to RNC and makes a decision breakout=YES (step 1855). IuPS DOGW sends a message to IuB DOGW indicating breakout=YES (step 1860). Continuing on FIG. 19, SGSN sends an RAB assignment request to UE (step 1865). IuPS DOGW detects the RAB assignment request from SGSN to UE and replaces the SGSN transport address with IuPS DOGW transport address (step 1870). IuPS DOGW sends a message to MIOP@Core indicating breakout=YES (step 1875). RNC communicates with NodeB and UE to (re) configure signaling and data radio bearer (step 1880). RNC acknowledges to SGSN when RAB assignment is complete (step 1885). SGSN accepts PDP context activation by sending a message to UE (step 1890). UE and SGSN may then exchange data for the PDP context (step 1895).

Figure 20:
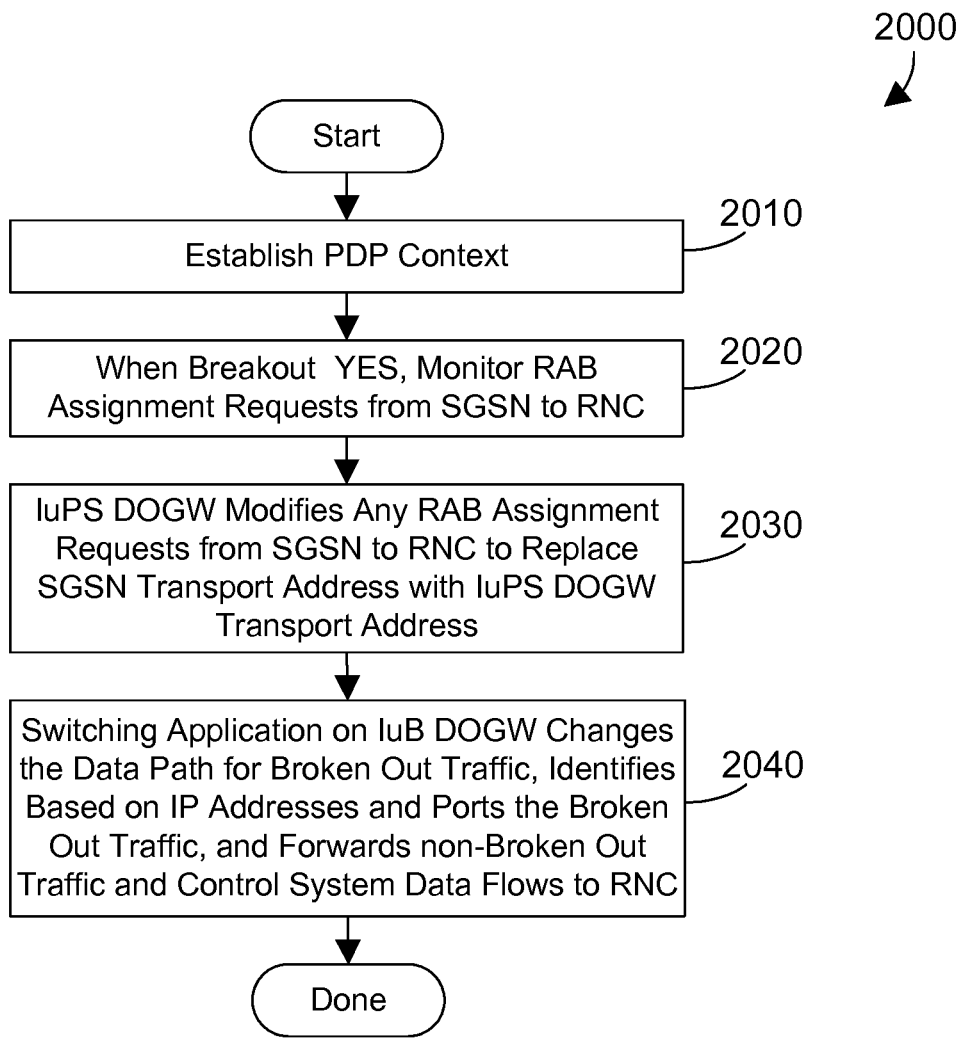
FIG. 20 is a flow diagram of a second method for the specific implementation shown in FIG. 17.

Referring to FIG. 20, a method 2000 begins by establishing a PDP context (step 2010). Method 1800 in FIGS. 18 and 19 include the detailed steps for establishing a PDP context. When breakout=YES, RAB assignment requests from SGSN to RNC are monitored by IuPS DOGW (step 2020). IuPS DOGW modifies any RAB assignment requests from SGSN to RNC to replace the SGSN transport address in the RAB assignment request with the IuPS DOGW transport address (step 2030) in case of matching breakout criteria during PDP context activation procedure. The switching application on IuB DOGW is configured upon the RAN transport layer setup to identify based on IP addresses and ports the broken out traffic and forwards this traffic to the Offload data handler 1765, and forwards non-broken out traffic and control system data flows to the RNC (step 2040).

Figure 21:
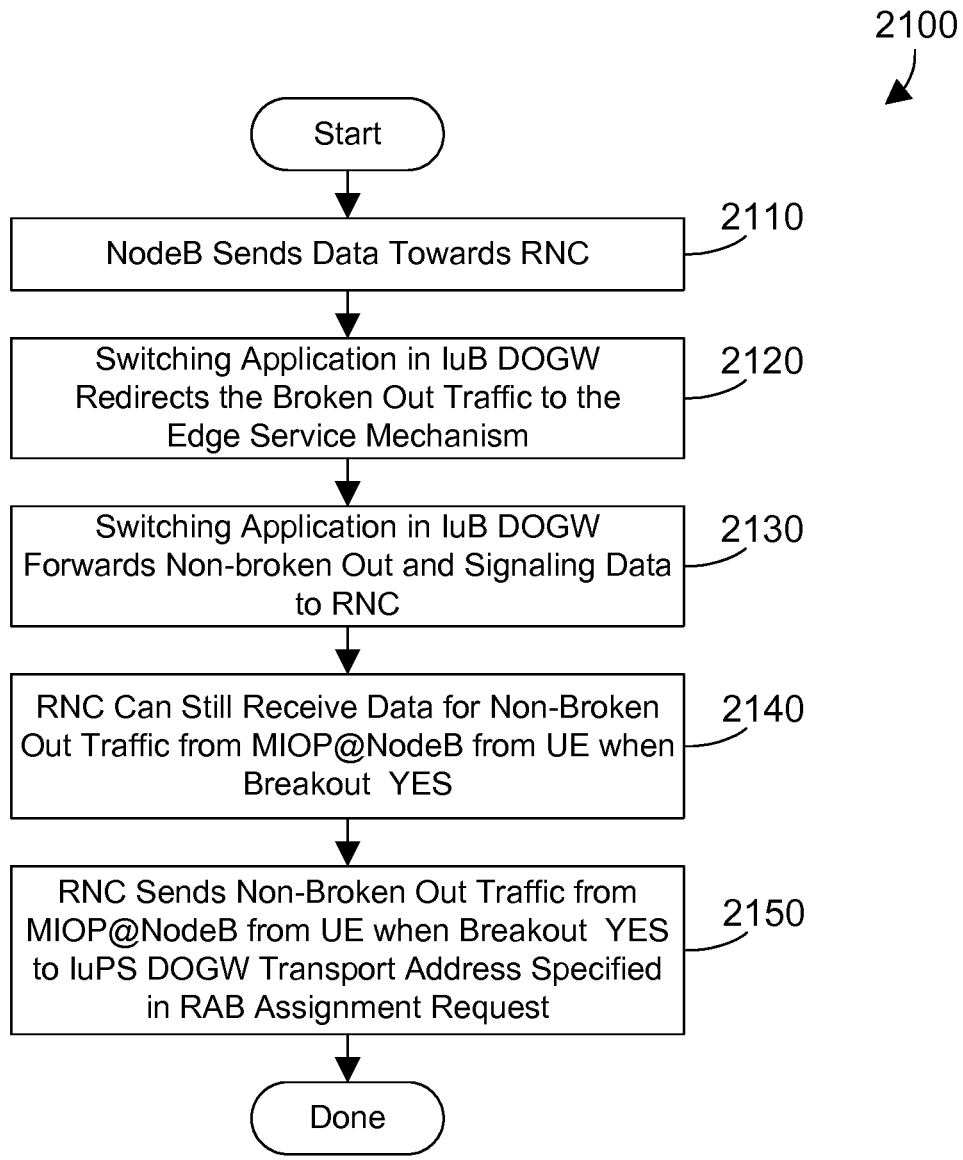
FIG. 21 is a flow diagram of a third method for the specific implementation shown in FIG. 17.

Referring to FIG. 21, a method 2100 begins when NodeB sends data towards RNC (step 2110). The switching application in IuB DOGW redirects the broken out traffic to the edge service mechanism (step 2120), such as edge cache mechanism 1730 in FIG. 17. The switching application also forwards non-broken out data and signaling data to the RNC (step 2130) via the original RAN connections. The RNC can still receive data for non-broken out traffic from MIOP@NodeB when breakout=YES (step 2140). The RNC then sends non-broken out traffic from MIOP@NodeB from UE when breakout=YES to IuPS DOGW transport address specified in RAB assignment request (step 2150).

Figure 22:
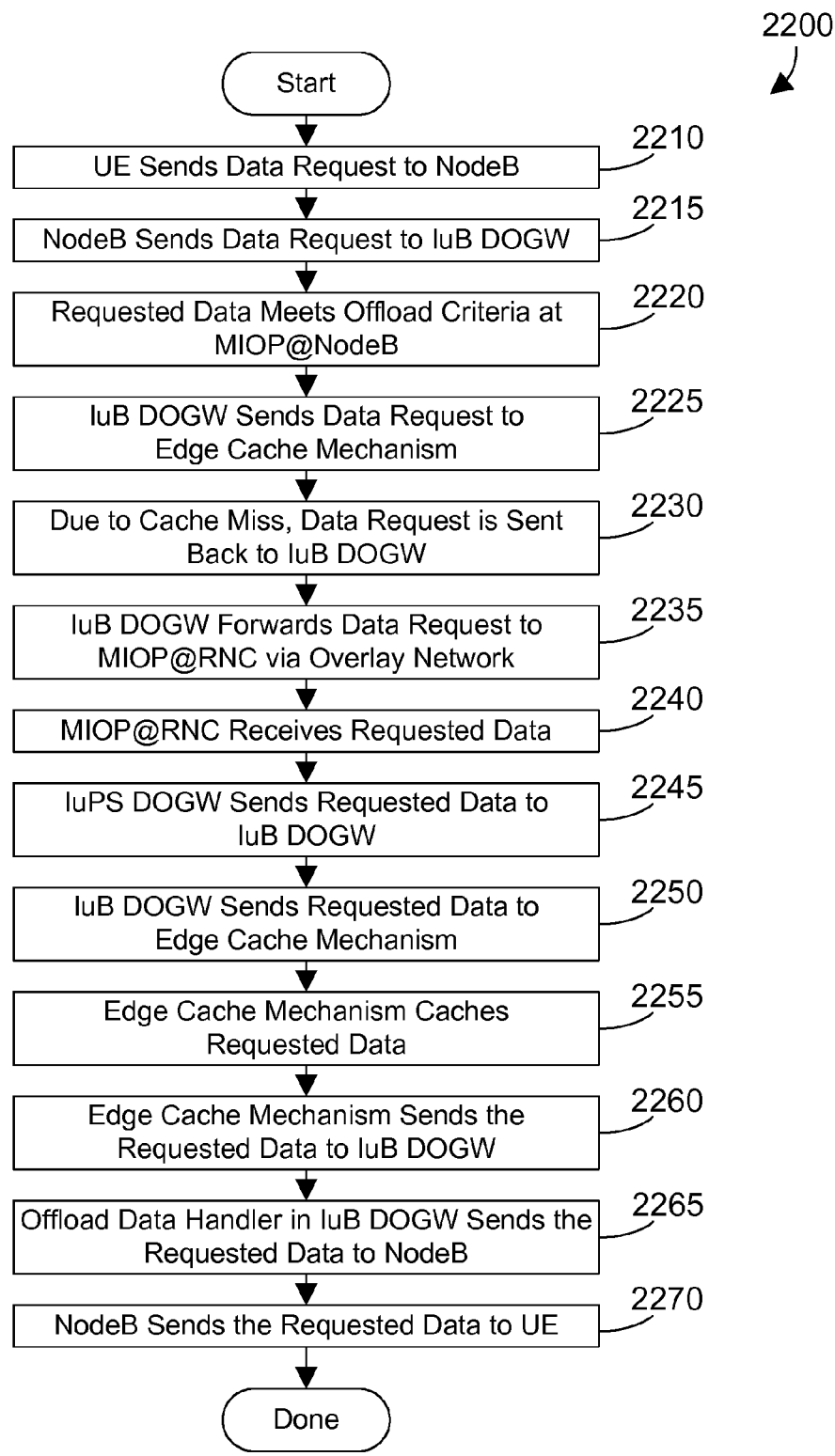
FIG. 22 is a flow diagram of a method for the specific implementation shown in FIG. 17 to process a data request that results in a cache miss at MIOP@NodeB.

A simple example is now provided for the specific implementation in FIG. 17 to show how data can be cached and delivered by MIOP@NodeB 210. Referring to FIG. 22, method 2200 represents steps performed in the implementation in FIG. 17 for a cache miss. UE sends a data request to NodeB (step 2210). NodeB sends the data request to IuB DOGW (step 2215). We assume the requested data meets the offload criteria at MIOP@NodeB (step 2220), which means MIOP@NodeB has been authorized to perform breakout and has determined this requested data should be broken out. IuB DOGW sends the data request to the edge cache mechanism (step 2225). We assume the data is not present in the edge cache mechanism, so due to the cache miss, the edge cache mechanism sends the data request back to IuB DOGW (step 2230). IuB DOGW then forwards the data request to MIOP@RNC via the overlay network (step 2235). In the worst case the content is not cached on MIOP@RNC or MIOP@Core, MIOP@RNC routes the data request to via the overlay network to the MIOP@Core, which passes the data request up the line to the internet, which delivers the requested data to MIOP@Core, which delivers the requested data via the overlay network to MIOP@RNC (step 2240). IuPS DOGW then sends the requested data to IuB DOGW (step 2245). IuB DOGW then sends the requested data to the edge cache mechanism (step 2250). The edge cache mechanism caches the requested data (step 2255). The edge cache mechanism sends the requested data to IuB DOGW (step 2260). The offload data handler in IuB DOGW sends the requested data to NodeB (step 2265). NodeB then sends the requested data to UE (step 2270). At this point, method 2200 is done.

Figure 23:
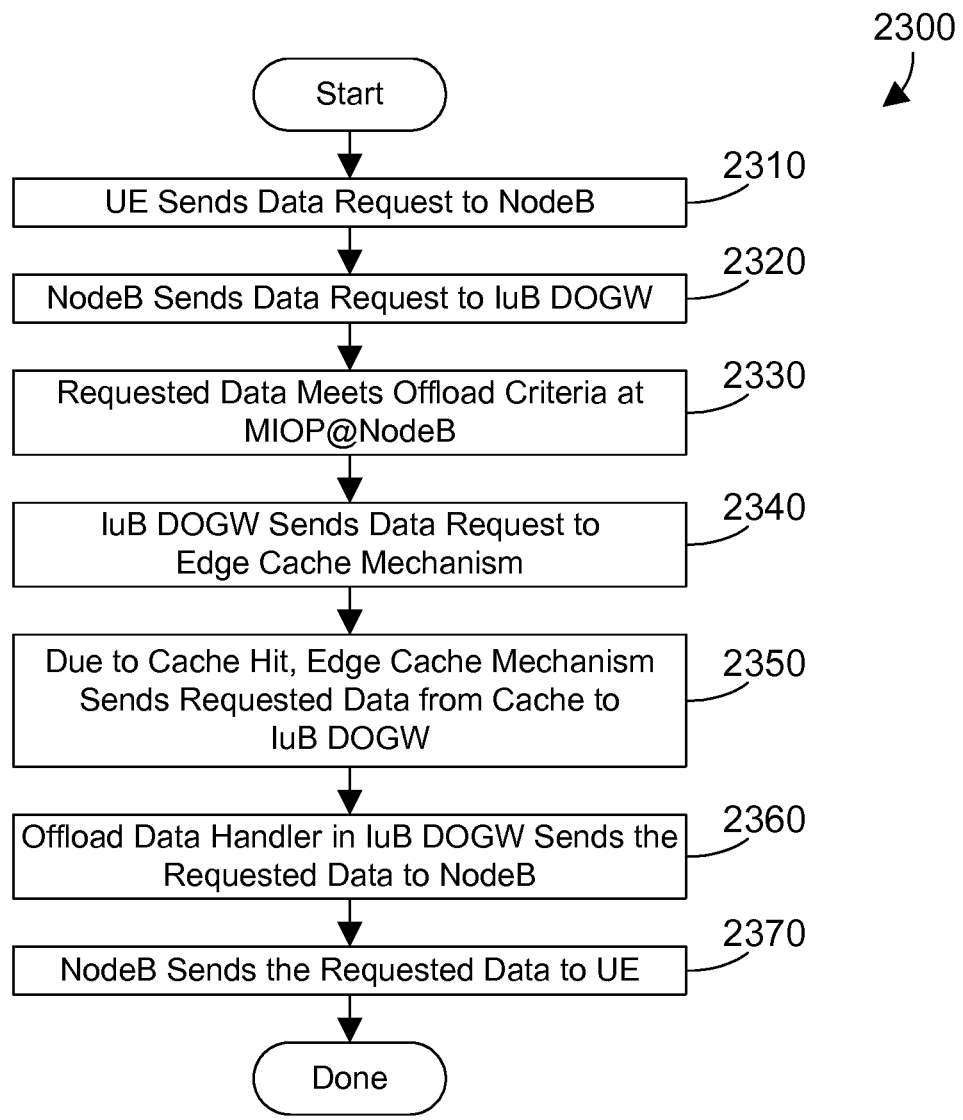
FIG. 23 is a flow diagram of a method for the specific implementation shown in FIG. 17 to process a data request that results in a cache hit at MIOP@NodeB.

Method 2300 in FIG. 23 shows the steps performed for a cache hit in the specific implementation in FIG. 17. The UE sends the data request to NodeB (step 2310). NodeB sends the data request to IuB DOGW (step 2320). The requested data meets the offload criteria at MIOP@NodeB (step 2330). IuB DOGW sends the data request to the edge cache mechanism (step 2340). Due to a cache hit, the edge cache mechanism sends the requested data from the cache to IuB DOGW (step 2350). The offload data handler in IuB DOGW sends the requested data to NodeB (step 2360). Node B then sends the requested data to UE (step 2370). Method 2300 shows a great advantage in caching data at MIOP@NodeB. With data cached at MIOP@NodeB, the data may be delivered to the user equipment without any backhaul on the core network. The result is reduced network congestion in the core network while improving quality of service to the subscriber.

The methods shown in FIGS. 18-23 provide detailed steps for the specific implementation in FIG. 17. Other implementations may have detailed steps that are different than those shown in FIGS. 18-23. These are shown by way of example, and are not limiting of the disclosure and claims herein.

As can be seen in method 2300 in FIG. 23, when a cache hit occurs at MIOP@NodeB, the MIOP@NodeB sends the requested data to the user equipment without having to retrieve the data from an external network such as internet 180. The net result is improved quality of service for the subscriber while reducing backhaul in the core network. However, this reduction in backhaul due to serving data at the edge may have an unintended consequence. In known 3G networks, the RNC 140 is responsible for assigning radio channels to a subscriber session. Many RNCs initially assign a high-speed channel, then monitor the user traffic during the subscriber session. If the subscriber is actively using the channel above some specified threshold, the RNC maintains the high-speed channel for the subscriber session. If the user traffic falls below the specified threshold, the RNC performs a channel type switch from high-speed channel to low-speed channel. Note, however, that when data is being broken out at MIOP@NodeB and data requests may be satisfied from the local cache in the MIOP@NodeB, the normal backhaul is reduced such that the amount of traffic visible to the RNC is not indicative of the activity of the channel. Thus, the RNC could switch a channel that is very active and has a MIOP@NodeB serving a significant amount of data at the edge to a low-speed channel because the RNC does not see the activity within the MIOP@NodeB.

Figure 24:
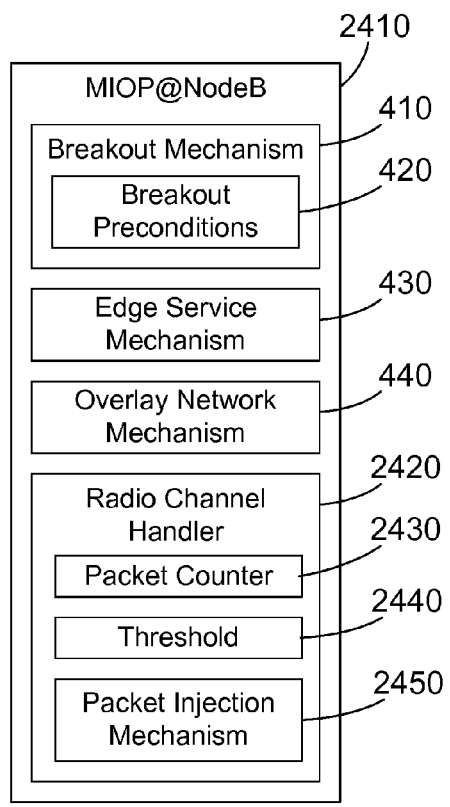
FIG. 24 is a block diagram of one suitable implementation of a MIOP@NodeB that includes a radio channel handler.

To avoid the problem of undesirable channel type switching by the RNC due to detected low activity by the RNC when the channel is actually active in the MIOP@NodeB, radio channel handlers may inject channel maintenance data packets so the RNC sees sufficient traffic to avoid a channel type switch. FIG. 24 illustrates an expanded version of the MIOP@NodeB introduced in FIG. 4. In addition to the breakout mechanism 410, edge service mechanism 430, and the overlay network mechanism 440 described above, the MIOP@NodeB 2410 also preferably includes a radio channel handler 2420 that injects channel maintenance traffic in the uplink data stream in the radio access network. The radio channel handler 2420 includes a packet counter 2430, a threshold 2440, and a packet injection mechanism 2450. The packet counter 2430 can count the number of packets for a selected channel in the MIOP@NodeB 2410. The threshold 2440 is the desired data rate for a selected channel. The packet injection mechanism 2450 injects channel maintenance traffic packets when required into the uplink data stream in the radio access network.

Figure 25:
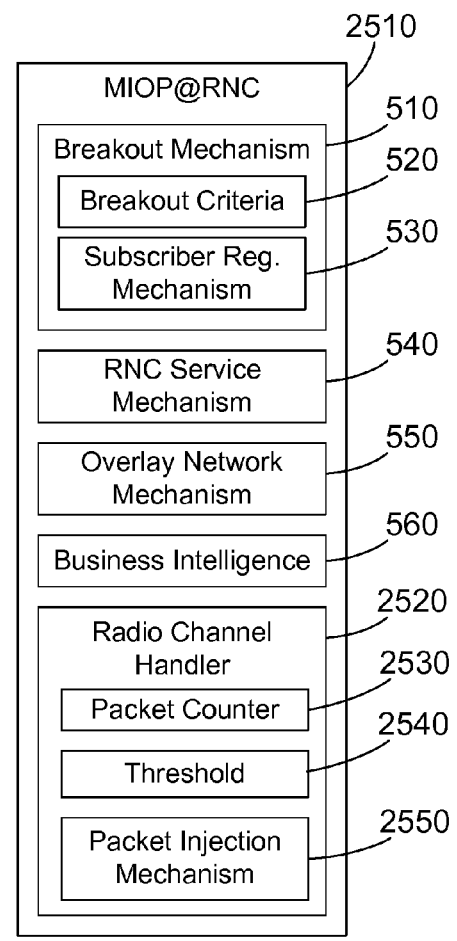
FIG. 25 is a block diagram of one suitable implementation of a MIOP@RNC that includes a radio channel handler.

FIG. 25 illustrates an expanded version of the MIOP@RNC introduced in FIG. 5. In addition to the breakout mechanism 510, RNC service mechanism 540, the overlay network mechanism 550, and the business intelligence 560 described above, the MIOP@RNC 2510 also preferably includes a radio channel handler 2520 that injects channel maintenance traffic packets in the downlink data stream in the core network. The radio channel handler 2520 includes a packet counter 2530, a threshold 2540, and a packet injection mechanism 2550. The packet counter 2530 can count the number of packets for a selected channel. The threshold 2540 is the desire data rate for a selected channel. The packet injection mechanism 2550 injects the channel maintenance traffic packets when required into the downlink data stream in the core network.

Figure 26:
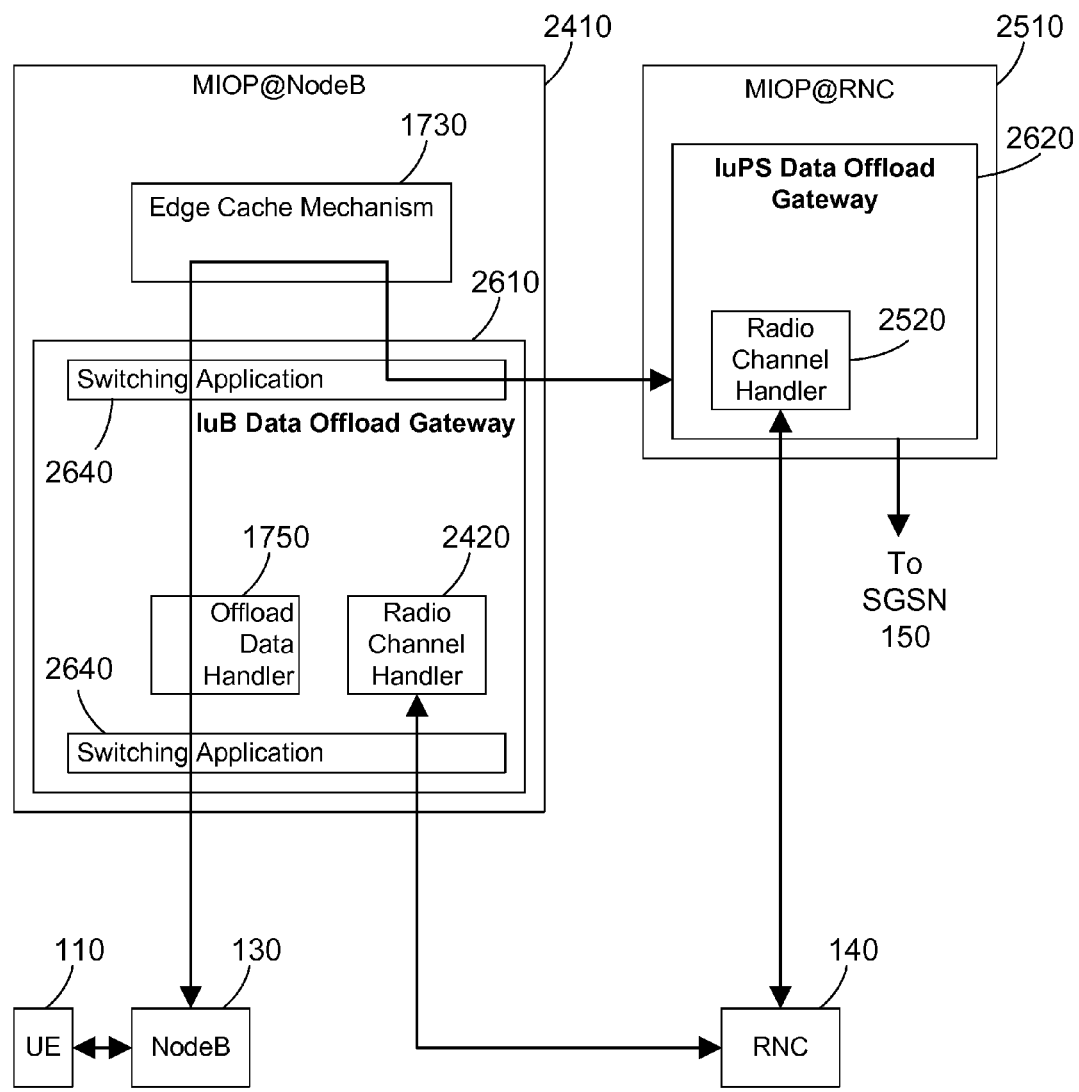
FIG. 26 is a block diagram of one suitable implementation for MIOP@NodeB and MIOP@RNC that includes a radio channel handler in each.

FIG. 26 illustrates an expanded version of the MIOP@NodeB and MIOP@RNC introduced in FIG. 17. We assume for this example the IuB Data Offload Gateway 2610 in FIG. 26 performs all the functions discussed above with respect to IuB Data Offload Gateway 1710 in FIG. 17, in addition to performing other functions discussed below. We further assume the IuPS DOGW 2620 in FIG. 26 performs all the functions discussed above with respect to IuPS DOGW 1770 in FIG. 17, in addition to performing other functions discussed below. FIG. 26 shows the addition of the radio channel handler 2420 in the IuB DOGW 2610 and the addition of the radio channel handler 2520 in the IuPS DOGW 2620. These correspond to radio channel handlers 1760 and 1780 shown in FIG. 17 as discussed briefly above. These radio channel handlers 2420 and 2520 are used to maintain a channel to avoid undesired channel type switching by the RNC when breakout is occurring at the edge of the mobile data network (e.g., in a MIOP@NodeB). The radio channel handler 2420 in FIG. 26 includes the packet counter 2430, threshold 2440, and packet injection mechanism 2450 shown in FIG. 24 even though these are not explicitly shown in FIG. 26 due to space constraints. Similarly, the radio channel handler 2520 in FIG. 26 includes the packet counter 2530, threshold 2540, and packet injection mechanism 2550 shown in FIG. 25 even though these are not explicitly shown in FIG. 26 due to space constraints. The function of the radio channel handlers 2420 and 2520 in FIG. 26 are now described with reference to the flow diagrams in FIGS. 27-32.

Figure 27:
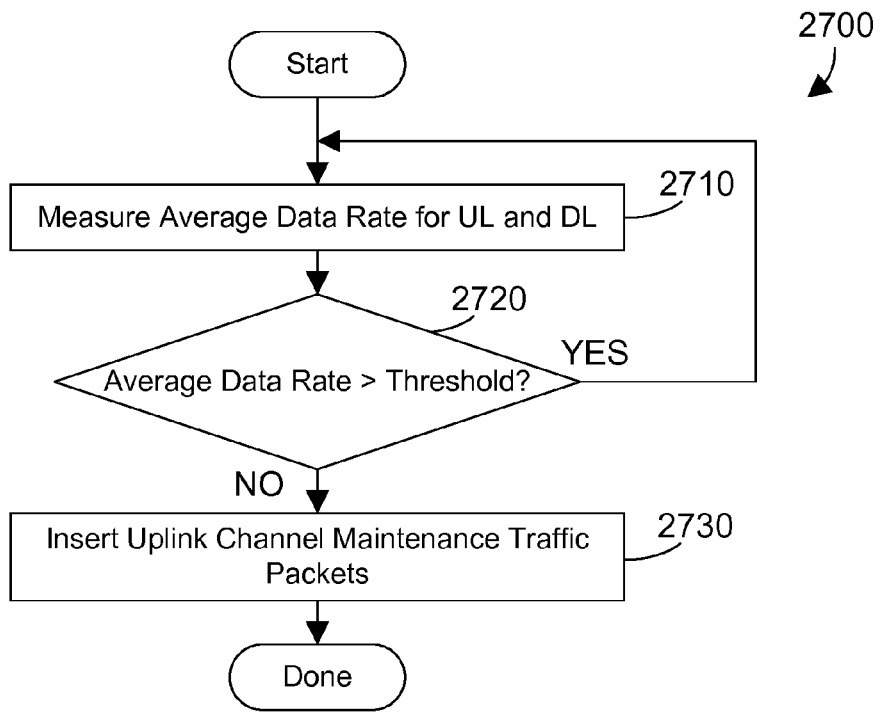
FIG. 27 is a flow diagram of a method performed by the MIOP@NodeB.

Referring to FIG. 27, method 2700 is preferably performed by the radio channel handler 2420 in the MIOP@NodeB 2410 shown in FIG. 24, and the description below refers to both FIG. 24 and FIG. 27. Note that maintenance data is only injected by the radio channel handlers 2420 and 2520 for broken-out channels. The MIOP@NodeB 2410 measures the average data rate for uplink and downlink traffic on a selected broken-out channel (step 2710). When the average data rate is above the threshold (step 2720=YES), method 2700 loops back to step 2710 and continues. When the average data rate is less than the threshold (step 2720=NO), uplink channel maintenance traffic packets are inserted by MIOP@NodeB 2410 (step 2730).

One specific implementation for method 2700 in FIG. 27 uses the specific configuration of MIOP@NodeB 2410 and MIOP@RNC 2510 shown in FIG. 26. MIOP@NodeB 2410 measures the average data rate in step 2710 using the offload data handler 1750 in IuB DOGW 2610. We assume offload data handler 1750 determines the appropriate threshold, and sends this threshold to radio channel handler 2420. The radio channel handler 2420 then performs step 2730 by inserting uplink data packets as needed (when the average data rate is not greater than the threshold (step 2720=NO)) according to the threshold received from the offload data handler. Note the radio channel handler 2420 may also send the threshold to the radio channel handler 2520 in MIOP@RNC 2510 over the overlay network, such as in a non-real packet as shown in FIG. 33.

Figure 28:
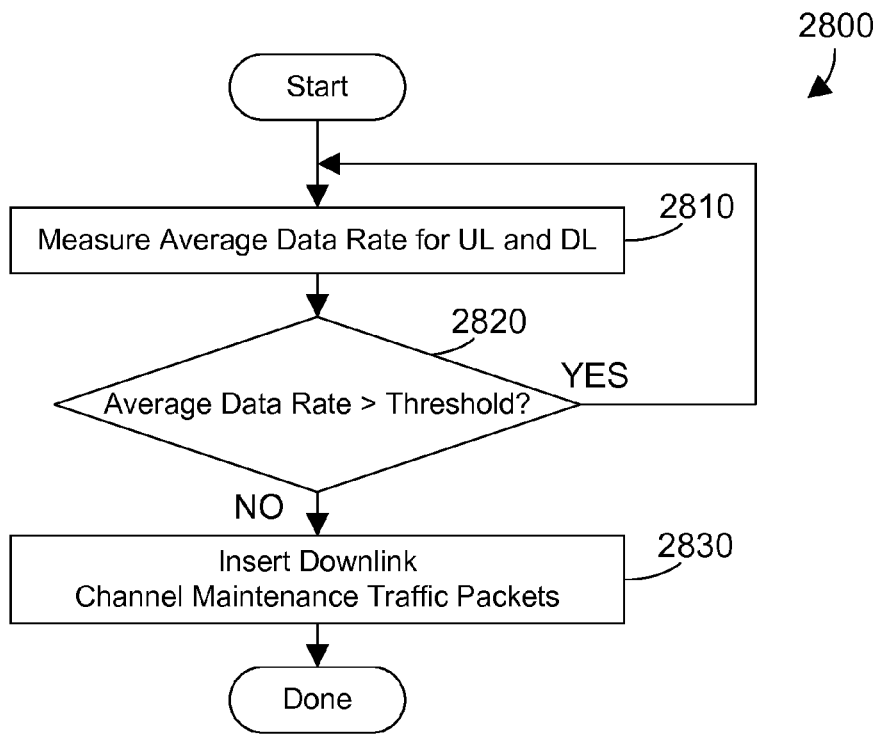
FIG. 28 is a flow diagram of a method performed by the MIOP@RNC.

Referring to FIG. 28, method 2800 is preferably performed by the radio channel handler 2520 in the MIOP@RNC 2510 shown in FIG. 25, and the description below refers to both FIG. 25 and FIG. 28. The MIOP@RNC 2510 measures the average data rate for uplink and downlink traffic on a selected channel that is broken-out at MIOP@NodeB (step 2810). When the average data rate is above the threshold (step 2820=YES), method 2800 loops back to step 2810 and continues. When the average data rate is less than the threshold (step 2820=NO), downlink channel maintenance traffic packets are inserted by MIOP@RNC 2510 (step 2730). Note the threshold may be determined by IuPS DOGW 2620 performing method 2900 in FIG. 29, or the threshold may be received in a message (such as a channel maintenance data or "non-real" packet) from the radio channel handler 2420 via IuB DOGW 2610.

Figure 29:
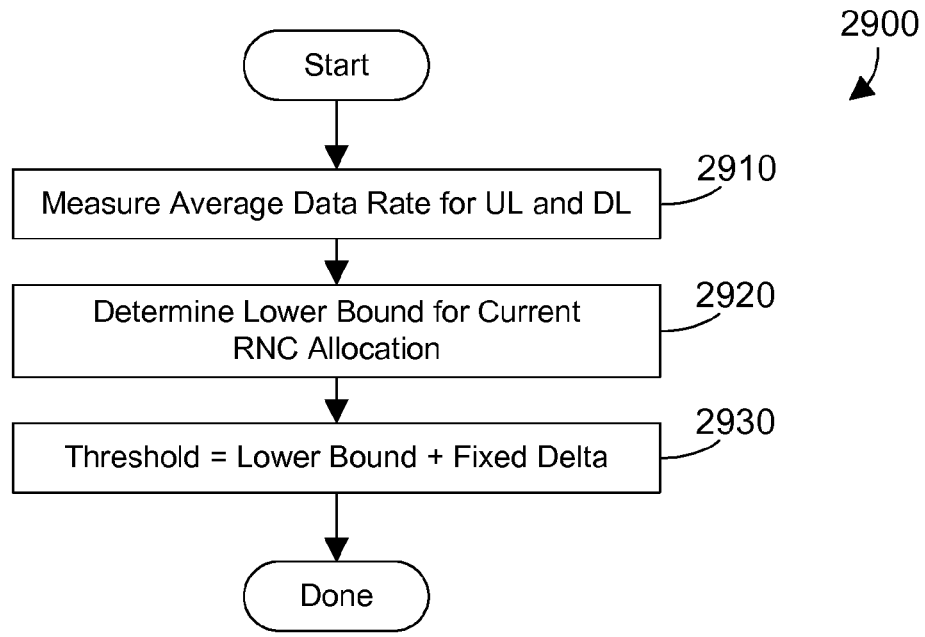
FIG. 29 is a flow diagram of one specific method for determining the threshold used by the radio channel handlers.

The thresholds 2440 and 2450 may be determined in any suitable manner. One suitable method for determining the value of thresholds 2440 and 2450 is shown in FIG. 29. The average data rate for uplink and downlink for a given broken-out channel is measured (step 2910). The lower bound for the current RNC allocation is then determined (step 2920). The threshold is then set to the value of the lower ban plus some fixed delta (step 2930). A simple example will illustrate. Let's assume the RNC allocates radio resources to a subscriber data session in $2^n$ kbit steps based on measured actual average data rate in the downlink and uplink for the subscriber's channel.

Let's further assume the average data rate measured in step 2910 for uplink and downlink for the subscriber's channel is 64 Kbps, which corresponds to $2^6$. The lower bound for the current RNC allocation is $2^{(n-1)}$, or 32 Kbps. The threshold is determined by taking the lower threshold of 32 Kbps and adding a fixed delta such as 2 Kbps to arrive at a threshold of 34 Kbps. For the RNC to perform channel type switching, it would have to see the average data rate fall below 32 Kbps. But the radio channel handlers 2420 and 2520 will assure the data rate does not fall below the threshold of 34 Kbps, which means the RNC will not do a channel type switch for this particular subscriber's channel.

Note the threshold determined in method 2900 in FIG. 29 is not necessarily a static threshold that does not change. To the contrary, the threshold may be dynamically adjusted to account for changing conditions. Thus, if the data rate measured in step 2910 doubles, the lower bound for the current RNC allocation changes, which will cause a corresponding change in the threshold. The result is a dynamically-changing threshold that assures the data rate does not drop so far that the RNC will perform a channel type switch. In the alternative, the threshold could be set to a static value. Some RNC implementations may implement a proprietary algorithm for channel type switching in which a very low data rate may be sufficient to induce a channel type switch. If this is the case, the threshold could be a static threshold that is set to a particular value as determined by the data rate in the RNC that may cause a channel type switch. Once set, the threshold may stay the same or be changed as needed.

Figure 30:
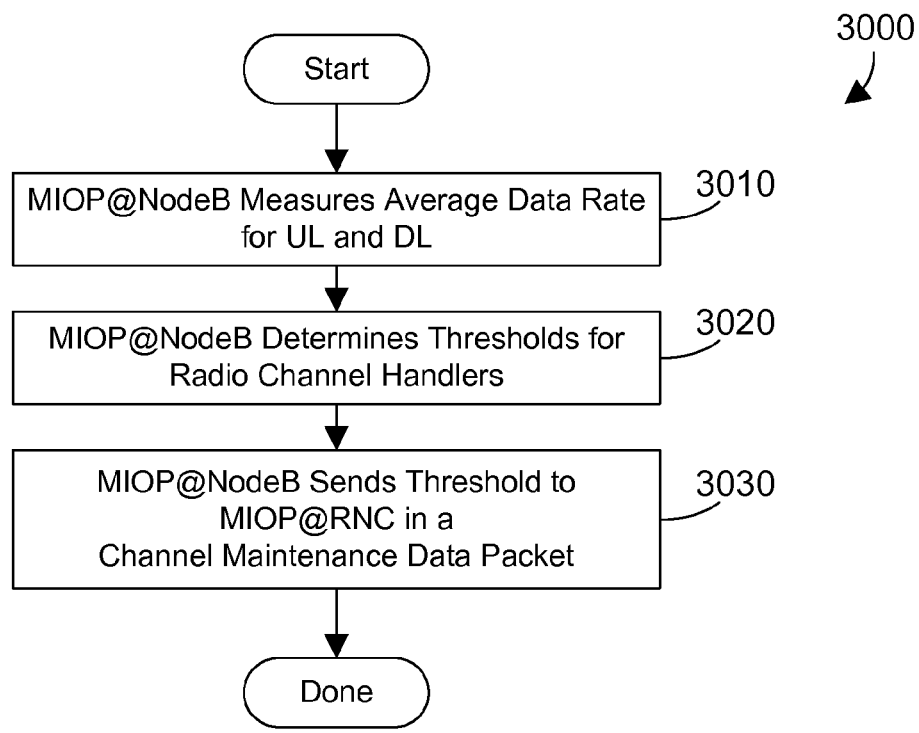
FIG. 30 is a flow diagram of a method for MIOP@NodeB to determine the threshold for the radio channel handlers and send the threshold to MIOP@RNC.

In a preferred implementation, only MIOP@NodeB determines the thresholds, then sends the applicable threshold to MIOP@RNC, as shown in FIG. 30. Method 3000 begins by the MIOP@NodeB measuring average data rate for uplink and downlink (step 3010). This may be done by the offload data handler 1750 shown in FIG. 26. MIOP@NodeB then determines the thresholds for the radio channel handlers (step 3020). Method 2900 shown in FIG. 29 is one suitable way for the MIOP@NodeB to determine the threshold in step 3020. MIOP@NodeB then sends the threshold value to MIOP@RNC in a channel maintenance data packet (step 3030). This may be done by radio channel handler 2420 sending a channel maintenance data packet that includes the threshold via IuB DOGW 2610 to the radio channel handler 2520 in MIOP@RNC 2510 via IuPS DOGW 2620. MIOP@RNC then uses the threshold value received from MIOP@NodeB to insert the requested rate for channel traffic maintenance into the downlink direction.

In a preferred implementation, each uplink channel maintenance data packet sent by the radio channel handler 2420 in MIOP@NodeB 2410, when detected by MIOP@RNC 2510, will cause MIOP@RNC 2510 to send a corresponding downlink channel maintenance packet in the core network. In similar fashion, each downlink channel maintenance data packet sent by the radio channel handler 2520 in MIOP@RNC 2510, when detected by MIOP@NodeB 2410, will cause MIOP@NodeB 2410 to send a corresponding uplink channel maintenance data packet in the radio access network. Thus, there is a type of handshake between MIOP@NodeB 2410 and MIOP@RNC 2510 when exchanging channel maintenance data packets.

Figure 31:
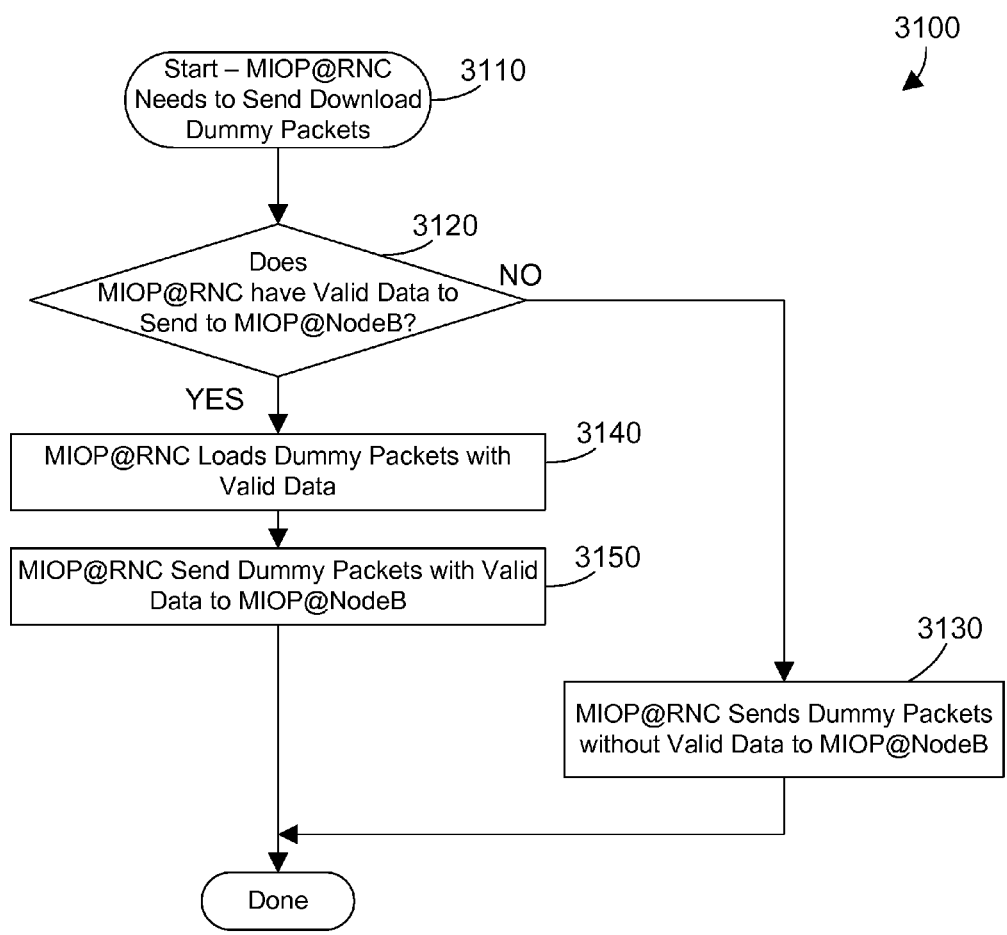
FIG. 31 is a flow diagram of a method for loading channel maintenance data packets with valid data.

Referring to FIG. 31, a method 3100 is preferably performed by MIOP@RNC 2510, and starts when MIOP@RNC needs to send downlink channel maintenance data packets (step 3110). Method 3100 checks to see if MIOP@RNC has any valid data it needs to send to MIOP@NodeB (step 3120). When MIOP@RNC has no valid data it needs to send to MIOP@NodeB (step 3120=NO), MIOP@RNC sends channel maintenance data packets without valid data to MIOP@NodeB (step 3130). When MIOP@RNC has valid data it needs to send to MIOP@NodeB (step 3120=YES), MIOP@RNC loads channel maintenance data packets with valid data (step 3140), and sends the channel maintenance data packets with valid data to MIOP@NodeB (step 3150). Method 3100 is then done. Note the packets send in step 3150 are channel maintenance data (i.e., not "real") packets even though they contain valid data because the header information indicates the protocol ID of 254. Protocol ID 254 is used for experimental and testing purposes. Any packet that has a protocol ID of 254 is defined in the MIOP system as a channel maintenance data packet. So any channel maintenance data packet will have a protocol ID of 254, which informs MIOP@NodeB and MIOP@RNC they should terminate these packets because these are channel maintenance packets.

Method 3100 may be used whenever MIOP@RNC has data it needs to send to MIOP@NodeB. One possible scenario where this would occur is when MIOP@NodeB provides an edge cache mechanism as shown in FIG. 17, and a user request for data results in a cache miss, as discussed above with reference to FIG. 22. Note that step 2245 in FIG. 22 is for IuPS DOGW to send the requested data (retrieved as a result of the cache miss) to IuB DOGW. Some or all of this requested data could be sent in channel maintenance data packets as shown in method 3100 and discussed above. Method 3100 expressly extends to sending any suitable data that MIOP@RNC needs to communicate with MIOP@NodeB as data in channel maintenance data packets. By using channel maintenance data packets to convey valid data, the traffic in the mobile data network is reduced.

Referring to FIG. 32, a flow diagram of a method is shown. Method 3200 determines when a subscriber is inactive (step 3210). When the subscriber is inactive (step 3210=YES), method 3200 disables generation of channel maintenance data packets by the radio channel handlers (step 3220). Inactivity may be defined in step 3210 in any suitable way, such as subscriber activity that falls below some defined threshold.

Referring to FIG. 33, a block diagram of a channel maintenance data packet 3300 is shown. The channel maintenance data packet includes an Ethernet header, an IP header, and a UDP header. A GTP header is also included, the value of which is an identifier for a channel maintenance data packet that needs to be generated. The dummy IP header includes a version field, an IP HL field, a TOS field, a data gram length, a sequence number identifier, flags, time to live, protocol, header checksum, source address, and destination address. What makes channel maintenance data packet 3300 a "non-real" or "dummy" packet is placing a value of 254 in the Protocol ID field in the dummy header. The payload for channel maintenance data packets may not contain any valid data. Note, however, in the channel maintenance data packet 3300 shown in FIG. 33, the threshold Ty in bytes per second may be specified. This allows the radio channel handlers 2420 and 2520 to communicate the threshold to each other, as shown in step 3030 in FIG. 30.

The architecture of the MIOP system allows services to be layered or nested. For example, the MIOP system could determine to do breakout of high-speed channels at MIOP@NodeB, and to do breakout of low-speed channels at MIOP@RNC. In another example, MIOP@NodeB may have a cache, MIOP@RNC may also have a cache, and MIOP@Core may also have a cache. If there is a cache miss at MIOP@NodeB, the cache in MIOP@RNC could be checked, followed by checking the cache in MIOP@Core. Thus, decisions can be dynamically made according to varying conditions of what data to cache and where.

To support the MIOP services that are possible with the mobile data network 200 shown in FIG. 2, the preferred configuration of MIOP@NodeB 210 is a combination of hardware and software. The preferred configuration of MIOP@RNC 220 is also a combination of hardware and software. The preferred configuration of MIOP@Core 230 is software only, and can be run on any suitable hardware in the core network. The preferred configuration of MIOP@NMS 240 is software only, and can also be run on any suitable hardware in the core network.

In the most preferred implementation, the various functions of MIOP@NodeB 210, MIOP@RNC 220, MIOP@Core 230, and MIOP@NMS 240 are performed in a manner that is nearly transparent to existing equipment in the mobile data network. Thus, the components in prior art mobile data network 100 that are also shown in the mobile data network 200 in FIG. 2 have no knowledge of the existence of the various MIOP components, with the exception of existing routers that may need to be updated with routing entries corresponding to the MIOP components. The MIOP services are provided by the MIOP components in a way that requires no changes to hardware and only minor changes to software (i.e., new router entries) in any existing equipment in the mobile data network, thereby making the operation of the MIOP components transparent to the existing equipment once the MIOP components are installed and configured. The result is a system for upgrading existing mobile data networks as shown in FIG. 1 in a way that does not require extensive hardware or software changes to the existing equipment. The MIOP services herein can thus be performed without requiring significant capital expenditures to replace or reprogram existing equipment.

The mobile data network 200 disclosed herein includes MIOP components that provide a variety of different services that are not possible in prior art mobile data network 100. In the most preferred implementation, the MIOP components do not affect voice traffic in the mobile data network. In addition to performing optimizations that will enhance performance in the form of improved download speeds, lower latency for access, or improved quality of experience in viewing multimedia on the mobile data network, the MIOP architecture also provides additional capabilities that may produce new revenue-generating activities for the carrier. For example, analytics may be performed on subscriber sessions that allow targeting specific subscribers with additional services from the carrier to generate additional revenue. For example, subscribers congregating for a live music event may be sent promotions on paid for media related to that event. In another example, subscribers getting off a train may be sent a coupon promoting a particular shuttle company as they walk up the platform towards the street curb. Also, premium web content in the form of video or other multimedia may be served from local storage and the subscriber would pay for the additional content and quality of service.

While the mobile data network in FIG. 2 and discussed herein is in the context of a 3G mobile data network, the disclosure and claims herein expressly extend to other networks as well, including Long Term Evolution (LTE) networks, flat RAN networks, and code division multiple access (CDMA) networks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

Note the disclosure herein uses comparisons to illustrate the concepts of the MIOP architecture. For example, FIG. 27 includes step 2720 that determines when the average data rate is greater than the threshold. Note, however, these are given by way of example and illustration, and should not be construed as limiting. The same principles apply regardless of the specific comparison condition (e.g., greater than, or greater than or equal to). The disclosure and claims herein is not limited to any specific construction of the comparison conditions as shown in the specification and drawings.

The disclosure and claims are directed to a mobile data network that includes service mechanisms and methods for performing services in the mobile data network. A first service mechanism performs services at or near a basestation, at the edge of the mobile data network. A second service mechanism performs services in the core network. These mechanisms communicate as needed via an overlay network. When data is broken out, the data is delivered at the edge of the mobile data network, which means the true activity of the channel is not visible to the core network. The reduction of data in the core network due to serving data at the edge risks causing a switch from a high-speed channel to a low-speed channel by the mechanism in the core network that performs channel speed monitoring and assignment. To assure this does not happen, radio channel handlers monitor both uplink and downlink traffic, and inject channel maintenance data packets to maintain a level of traffic on the network that assures the channel switch does not occur.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for processing data packets in a mobile data network that includes a radio access network coupled to a core network, the method comprising the steps of:
    a plurality of antennas sending and receiving network messages between user equipment and a plurality of basestations in the radio access network, each basestation communicating with a corresponding one of the plurality of antennas;
    assigning a selected channel in the radio access network to be a high-speed channel;
    monitoring traffic on the selected channel;
    when a data rate on the selected channel is below a defined threshold, switching channel type of the selected channel from high-speed to low-speed;
    a first service mechanism in the radio access network that performs the steps of:
        defining an existing first data path in the radio access network for non-broken out data;
        defining a second data path for broken out data;
        identifying first data received from a corresponding basestation as data to be broken out;
        sending the first data on the second data path; and
        forwarding other data that is not broken out on the first data path;
        performing a first service for network messages in the radio access network based on the first data; and
        injecting a first plurality of channel maintenance data packets into an uplink data stream in the radio access network so the data rate does not fall below the defined threshold;
    a second service mechanism in the core network that performs the steps of:
        monitoring network messages in the core network; and
        providing a second service for the network messages in the mobile data network; and
        injecting a second plurality of channel maintenance data packets into a downlink data stream in the core network so the data rate does not fall below the defined threshold.

2. The method of claim 1 further comprising the steps of:
    measuring average data rate for uplink and downlink for the selected channel; and
    when the average data rate is less than a first threshold, injecting the first plurality of channel maintenance data packets for the selected channel into the uplink data stream in the radio access network.

3. The method of claim 2 further comprising the steps of:
    when the average data rate is less than a second threshold, injecting the second plurality of channel maintenance data packets for the selected channel into the downlink data stream in the core network.

4. The method of claim 2 wherein the step of determining the first threshold comprises the steps of:
    measuring average data rate for uplink and downlink for the selected channel;
    determining a lower bound for a current data rate allocation; and
    determining the first threshold is equal to the lower bound plus a fixed value.

5. The method of claim 2 further comprising the step of sending the second threshold from the first service mechanism to the second service mechanism.

6. The method of claim 1 further comprising the steps of:
    measuring average data rate for uplink and downlink for a selected channel; and
    when the average data rate is less than a second threshold, injecting the second plurality of channel maintenance data packets for the selected channel into the downlink data stream in the core network.

7. The method of claim 1 wherein the first service comprises caching of data in the radio access network and the second service comprises caching of data in the core network.

8. The method of claim 1 wherein at least one of the first plurality of channel maintenance data packets comprise a dummy header and valid data that needs to be communicated from the first service mechanism to the second service mechanism.

9. The method of claim 1 wherein at least one of the second plurality of channel maintenance data packets comprise a dummy header and valid data that needs to be communicated from the second service mechanism to the first service mechanism.

10. The method of claim 1 further comprising the step of:
when a data rate on a channel corresponding to a selected subscriber indicates the subscriber is inactive, performing the steps of:
inhibiting the injecting of the first plurality of channel maintenance data packets into the uplink data stream in the radio access network; and
inhibiting the injecting of the second plurality of channel maintenance data packets into the downlink data stream in the core network.

11. A method for processing data packets in a mobile data network that includes a radio access network coupled to a core network, the method comprising the steps of:
a plurality of antennas sending and receiving network messages between user equipment and a plurality of basestations in the radio access network, each basestation communicating with a corresponding one of the plurality of antennas;
assigning a selected channel in the radio access network to be a high-speed channel;
monitoring traffic on the selected channel;
when a data rate on the selected channel is below a defined threshold, switching channel type of the selected channel from high-speed to low-speed;
a first service mechanism in the radio access network that performs the steps of:
defining an existing first data path in the radio access network for non-broken out data;
defining a second data path for broken out data;
identifying first data received from a corresponding basestation as data to be broken out;
sending the first data on the second data path;
forwarding other data that is not broken out on the first data path;
performing caching of data in the radio access network based on the first data;
measuring average data rate for uplink and downlink for the selected channel;
when the average data rate is less than a first threshold, injecting a first plurality of channel maintenance data packets into an uplink data stream in the radio access network so the data rate does not fall below the defined threshold;
sending the first threshold to a second radio channel handler via an overlay network that comprises a virtual private network, the first threshold comprising a lower bound for a current data rate allocation plus a fixed amount;
a second service mechanism in the core network that performs the steps of:
monitoring network messages in the core network; and
providing second caching of data in the core network; and
injecting a second plurality of channel maintenance data packets into a downlink data stream in the core network so the data rate does not fall below the defined threshold;
the second radio channel handler measuring average data rate for uplink and downlink for the selected channel, and when the average data rate is less than the first threshold received from the first radio channel handler, the second radio channel handler injects a second plurality of channel maintenance data packets for the selected channel into the downlink data stream in the core network;
wherein the first plurality of channel maintenance data packets comprise a first channel maintenance data header and first valid data that needs to be communicated from the first service mechanism to the second service mechanism;
wherein the second plurality of channel maintenance data packets comprise a second channel maintenance data header and second valid data that needs to be communicated from the second service mechanism to the first service mechanism; and
inhibiting the injecting of the first plurality of channel maintenance data packets into the uplink data stream in the radio access network and the injecting of the second plurality of channel maintenance data packets into the downlink data stream in the core network when a data rate on the selected channel corresponding to a subscriber indicates the subscriber is inactive.

* * * * *